United States Patent
Dharamshi

(10) Patent No.: US 7,945,691 B2
(45) Date of Patent: May 17, 2011

(54) DATA CONVEYANCE MANAGEMENT

(75) Inventor: Gautam Dharamshi, Mountain View, CA (US)

(73) Assignee: SAP AG, Waldorf (DE)

( * ) Notice: Subject to any disclaimer, the term of this patent is extended or adjusted under 35 U.S.C. 154(b) by 1588 days.

(21) Appl. No.: 10/662,715

(22) Filed: Sep. 15, 2003

(65) Prior Publication Data

US 2005/0066050 A1 Mar. 24, 2005

(51) Int. Cl.
*G06F 15/16* (2006.01)
(52) U.S. Cl. .................................... 709/232; 709/238
(58) Field of Classification Search .................. 709/232, 709/238
See application file for complete search history.

(56) References Cited

U.S. PATENT DOCUMENTS

| | | | |
|---|---|---|---|
| 7,209,916 B1* | 4/2007 | Seshadri et al. ................... 1/1 |
| 2001/0042104 A1 | 11/2001 | Donoho et al. | |
| 2002/0032688 A1* | 3/2002 | Serrano-Morales et al. ........................ 707/104.1 |
| 2002/0087643 A1 | 7/2002 | Parsons et al. | |
| 2002/0120917 A1* | 8/2002 | Abrari et al. ................. 717/110 |
| 2003/0046282 A1* | 3/2003 | Carlson et al. .................... 707/6 |

FOREIGN PATENT DOCUMENTS

| | | |
|---|---|---|
| EP | 1 220 552 A1 | 7/2002 |
| WO | WO 03/049368 A2 | 6/2003 |

OTHER PUBLICATIONS

International Search Report, PCT/US2004/029508, Feb. 7, 2005, pp. 4.
ILOG JRules, Agility Across the Enterprise, http://www.ilog.com/products/jrules/, pp. 1-3, 2003.
ILOG JRules, New in version 4.5, http://www.ilog.com/products/jrules/whatsnew/index.cfm, pp. 1-2, 2003.
ILOG JRules, Business rule life cycle management, http://www.ilog.com/products/jrules/lifecycle/, pp. 1-2, 2003.
ILOG JRules, Business Rule Repository, http://www.ilog.com/products/jrules/lifecycle/repository.cfm, pp. 1-2, 2003.
ILOG JRules, Rule Builder, http://www.ilog.com/products/jrules/lifecycle/builder.cfm, pp. 1-3, 2003.
ILOG JRules, Business Rule Editors, http://www.ilog.com/products/jrules/lifecycle/editor.cfm, pp. 1-3, 2003.
ILOG JRules, Rule Language, http://www.ilog.com/products/jrules/lifecycle/language.cfm, pp. 1-2, 2003.

(Continued)

*Primary Examiner* — Joseph E Avellino
*Assistant Examiner* — Marshall McLeod
(74) *Attorney, Agent, or Firm* — Mintz Levin Cohn Ferris Glovsky and Popeo, P.C.

(57) ABSTRACT

Data conveyance management may be facilitated by a process performed at a data distribution device. The data distribution device may determine whether a message has been received indicating that data conveyance rules are to be modified and, if the message has been received, identify a rule template associated with the data conveyance rules, the identified rule template including at least one parameter. The data distribution device may also send a message specifying a user interface corresponding to the rule template and the parameter, determine whether a message including a specification of the parameter has been received, and, if the message has been received, create a rule by binding the template with the specified parameter.

28 Claims, 14 Drawing Sheets

OTHER PUBLICATIONS

ILOG JRules, Flexible deployment and easy integration, http://www.ilog.com/products/jrules/integration.cfm, pp. 1-3, 2003.

ILOG JRules, Performance and scalability, http://www.ilog.com/products/businessrules/performance.cfm, pp. 1-2, 2003.

ILOG JRules, Complete business rule management, Product Datasheet, pp. 1-6.

Jess, the Expert System Shell for the Java Platform, http://herzberg.ca.sandia.gov/jess, pp. 1 of 1, Sep. 2003.

Jess, the Rule Engine for the Java Platform, The Jess FAQ, Ernest J. Friedman-Hill and Sandia National Laboratories, http://herzberg.ca.sandia.gov/jess/FAQ.shtml, pp. 1-6, Sep. 2003.

Jess, the Rule Engine for the Java Platform, http://herzberg.ca.sandia.gov/jess/docs/index.shtml, pp. 1 of 1, May 2003.

Jess, The Expert System Shell for the Java Platform, Ernest J. Friedman-Hill, Version 6.1RC1, pp. 1-149, Mar. 24, 2003.

* cited by examiner

US 7,945,691 B2

DATA CONVEYANCE MANAGEMENT

COPYRIGHT NOTICE

A portion of this disclosure contains material that is subject to copyright protection. Specifically, portions of source code, scripting language, and program model and design information appear in the specification. The copyright owner has no objection to the facsimile reproduction of the specification as filed. Otherwise, all copyright rights are reserved.

BACKGROUND

The following description relates to data communication networks, for example, as used for data conveyance management.

In general, a client may be updated to receive new data from a server in either of two ways. First, a browser (or other client-side application) may intermittently ask the server for new data (often referred to as "pulling" data). Second, the server may send new data to the client as the data becomes available (often referred to as "pushing" data).

SUMMARY

In one general aspect, a technique for data conveyance management may be facilitated by a process performed at a data distribution device, which may, for example, be a server system or process. Such a process may include determining whether a message has been received indicating that data conveyance rules are to be modified and, if this type message has been received, identifying a rule template associated with the data conveyance rules, the identified rule template including at least one parameter. The process may also include sending a message specifying a user interface corresponding to the rule template and the parameter, determining whether a message has been received including a specification of the parameter, and, if the message has been received, creating a rule by binding the template with the specified parameter. The user interface may include a natural language description of a business function of a data conveyance rule created with the rule template and/or a natural language description of the parameters for the rule template. The process may be implemented manually, by machine, by instructions encoded in a machine-readable medium, or otherwise.

Certain implementations may include identifying a set of rule templates associated with data conveyance rules to be modified, sending a message specifying a user interface corresponding to the set of rule templates, and determining whether a message has been received indicating selection of one of the templates in the set.

Particular implementations may include translating a rule into a rule engine format. The rule engine format may, for example, be Jrules from ILOG.

Some implementations may include determining whether a message has been received including a subscription request, identifying data conveyance rules associated with the subscription request if a subscription request has been received, and sending data in accordance with the identified rules. The identified rules may be associated with a user of a data output device.

Certain implementations may include associating one of the data conveyance rules with a rule template, parsing the rule to identify specifications for parameters of the template, and sending a message specifying a user interface corresponding to the associated template, the identified parameters, and the identified specifications.

In another general aspect, a technique for data conveyance management may be facilitated by a process performed at a data output device, which may, for example, be a client system or process. The process may include determining whether a command indicating that data conveyance rules are to be modified has been received and, if the command has been received, sending a message indicating that data conveyance rules are to be modified. The process may also include determining if a message has been received specifying a user interface corresponding to a rule template and a parameter and generating the user interface if the message has been received. The rule template may be associated with one of the data conveyance rules. The process may additionally include determining whether a command indicating specification of the parameter has been received and, if the command has been received, sending a message including a specification of the parameter. The process may be implemented manually, by machine, by instructions encoded in a machine-readable medium, or otherwise.

Certain implementations may include determining whether a message has been received specifying a user interface corresponding to a set of rule templates, generating the user interface if the message has been received, determining whether a command indicating that one of the templates in the set has been selected has been received, and, if the command has been received, sending a message indicating selection of one of the templates.

In another general aspect, a system for data conveyance management may include a data output device and a data distribution device. The data output device may be operable to determine whether a command indicating that data conveyance rules are to be modified has been received and to send a message indicating that data conveyance rules are to be modified if the command has been received. The data output device may also be operable to determine if a message has been received specifying a user interface corresponding to a set of rule templates, the user interface including natural language descriptions of business functions of data conveyance rules created with the templates, and to generate the user interface if the message has been received. The data output device may further be operable to determine whether a command has been received indicating that one of the templates in the set has been selected and send a message indicating selection of one of the templates in the set if the command has been received. The data output device may additionally be operable to determine if a message has been received specifying a user interface corresponding to the selected rule template and a parameter of the selected rule template, the user interface including a natural language description of the parameter, and generate the user interface if the message has been received. The data output device may also be operable to determine whether a command indicating specification of the parameter has been received and send a message including a specification of the parameter if the command has been received. The data distribution device may be operable to determine whether the message has been received indicating that data conveyance rules are to be modified, identify a set of rule templates associated with the data conveyance rules to be modified if the message has been received, and send the message specifying a user interface corresponding to a set of rule templates. The data distribution device may also be operable to determine whether the message has been received indicating selection of one of the templates in the set, identify a parameter for the selected template, and send the message specifying a user interface corresponding to the selected rule template and a parameter of the selected rule template. The data distribution device is additionally operable to determine whether the message has been received including a specification of the parameter and, if the message has been received, create a rule by binding the rule template with the specified parameter. The data distribution device is also operable to translate the rule into a rule engine format, determine whether a message has been received including a subscription request, identify data conveyance rules associated with the subscription request if a subscription request has been received, and send data in accordance with the identified rules.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Figure 7A:
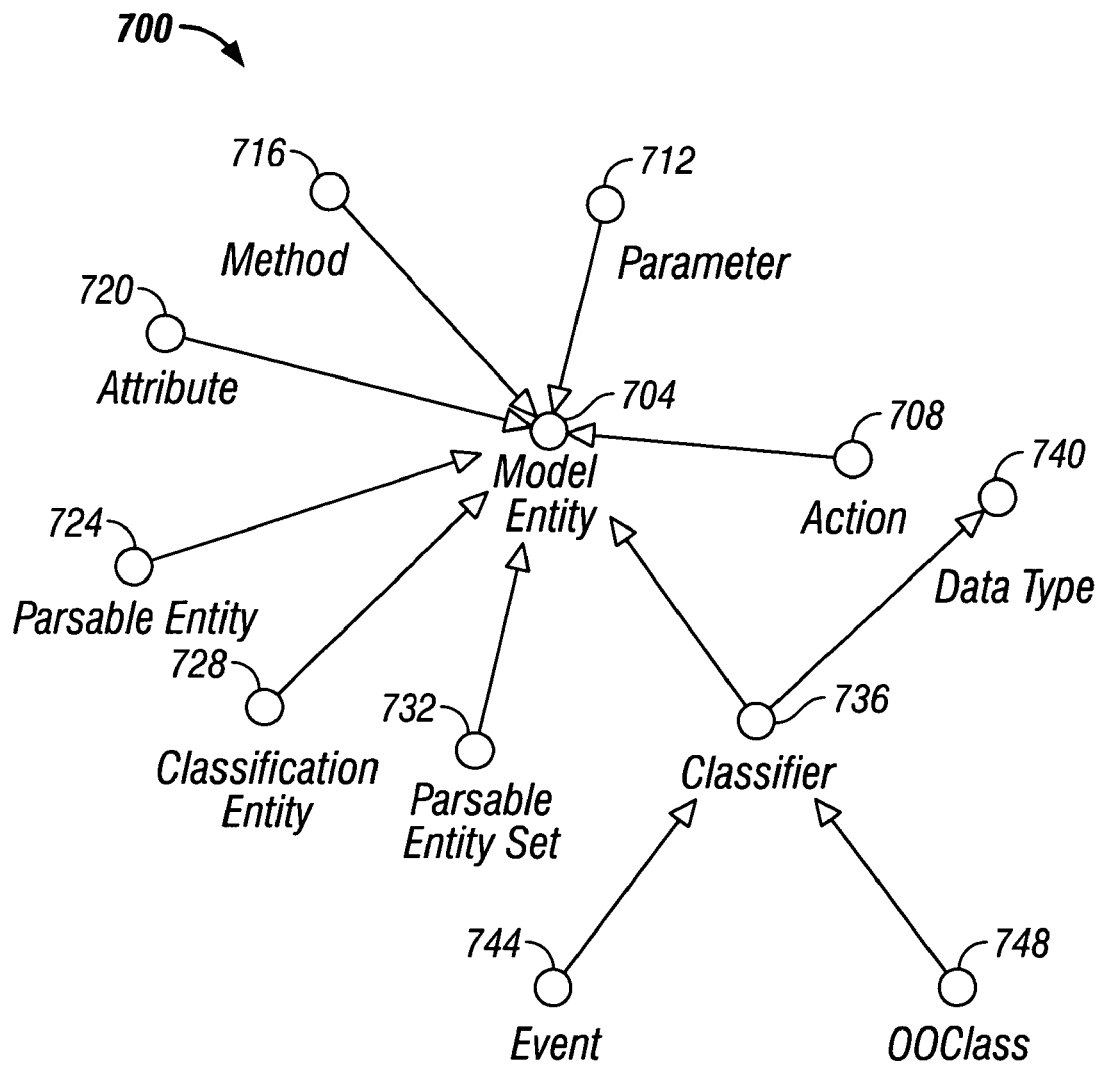
Figure 7B:
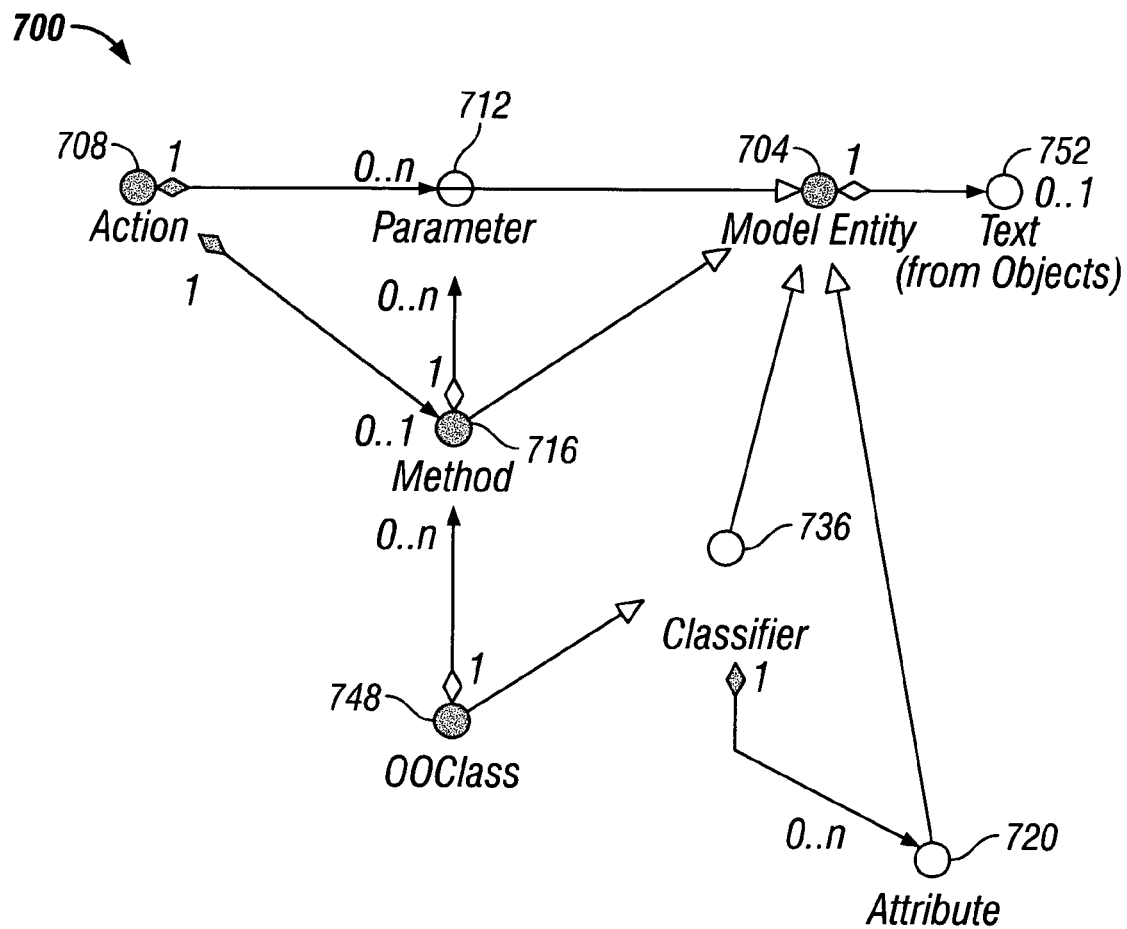

FIGS. 7A-B illustrate a metamodel object repository for data conveyance management.

Figure 8:
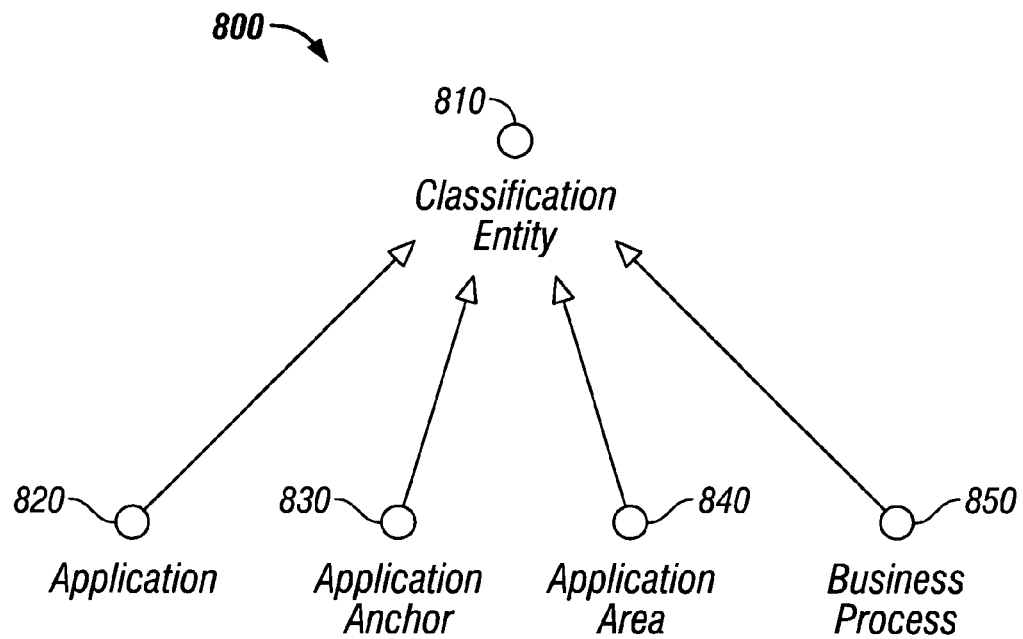

FIG. 8 illustrates a classification entity relationship for data conveyance management.

Figure 9:
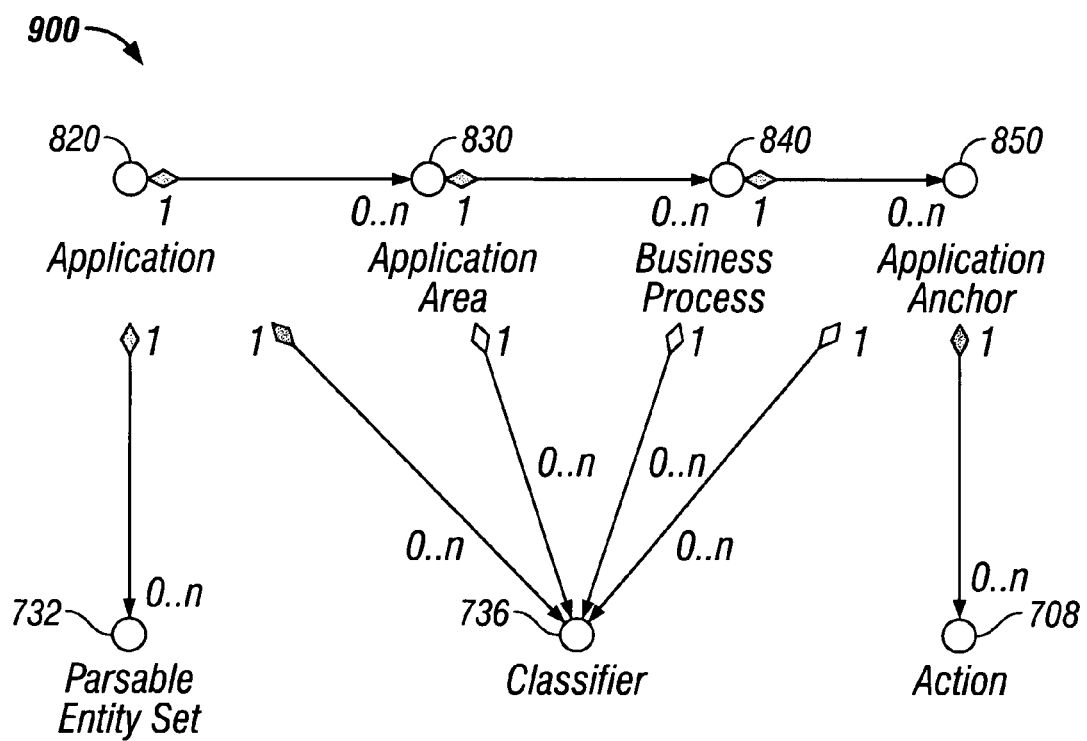

FIG. 9 illustrates a logical segregation of entities in FIGS. 7-8.

Figure 10:
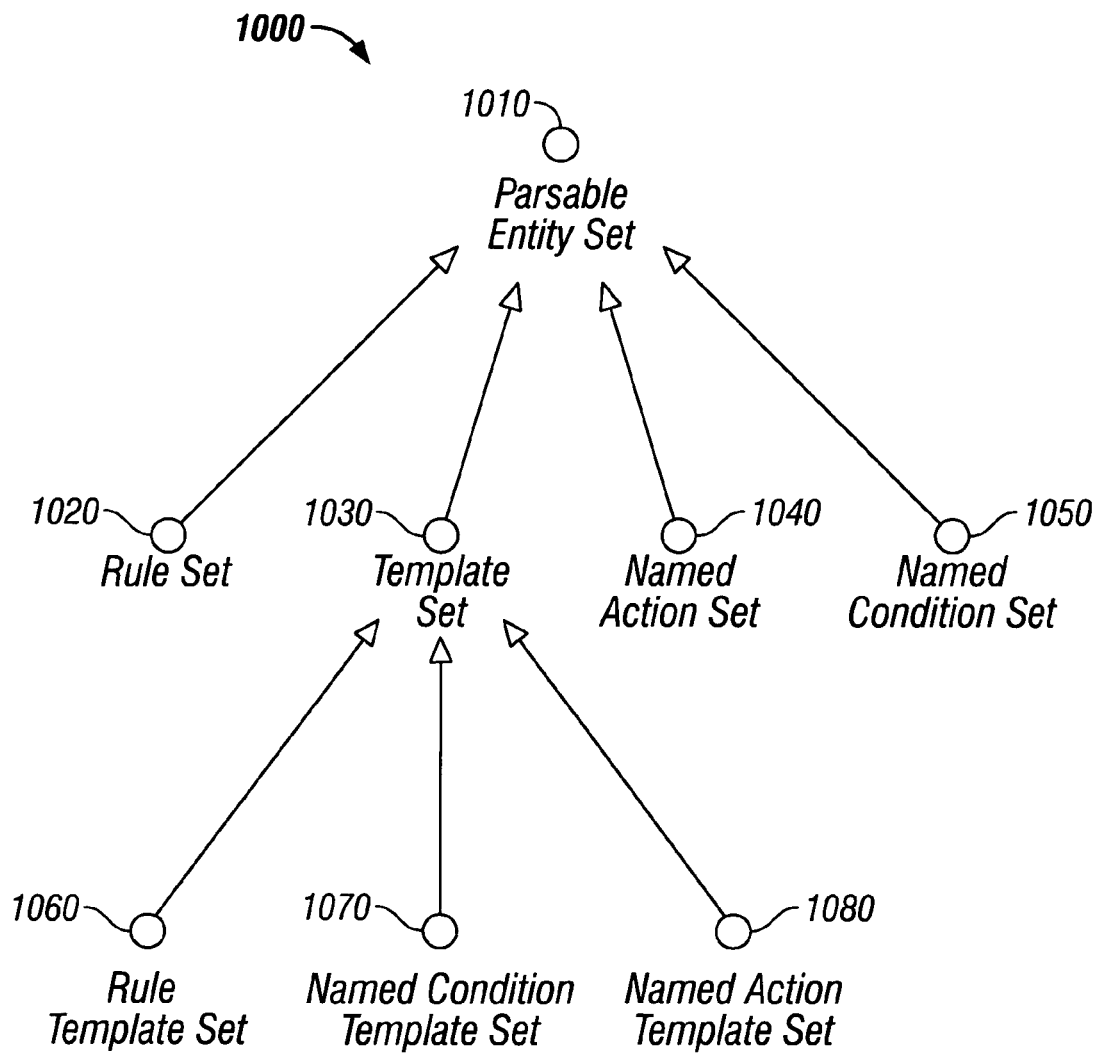

FIG. 10 illustrates a parsing relationship for data conveyance management.

Figure 11:
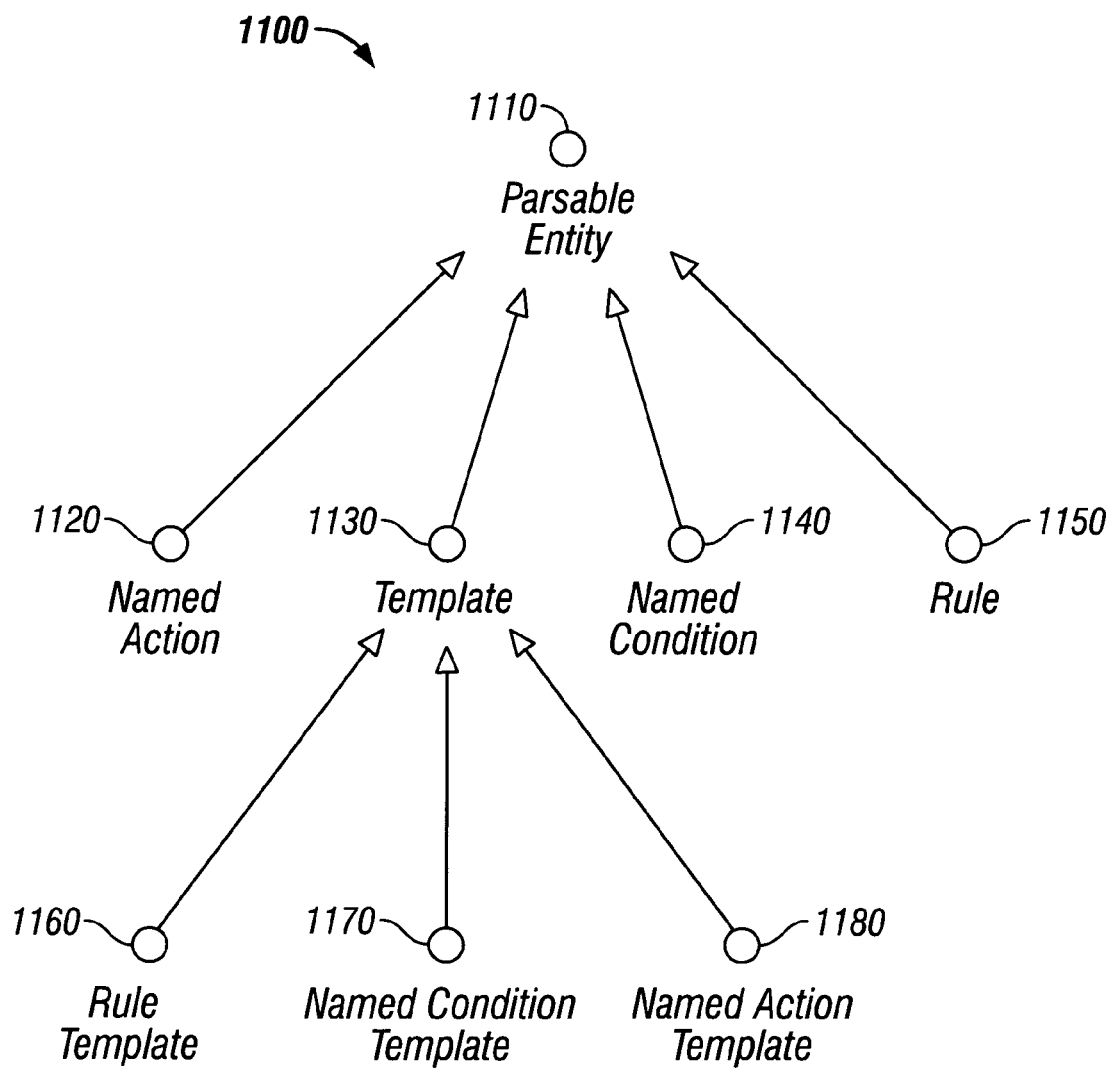

FIG. 11 illustrates a parsing relationship for data conveyance management.

Figure 12:
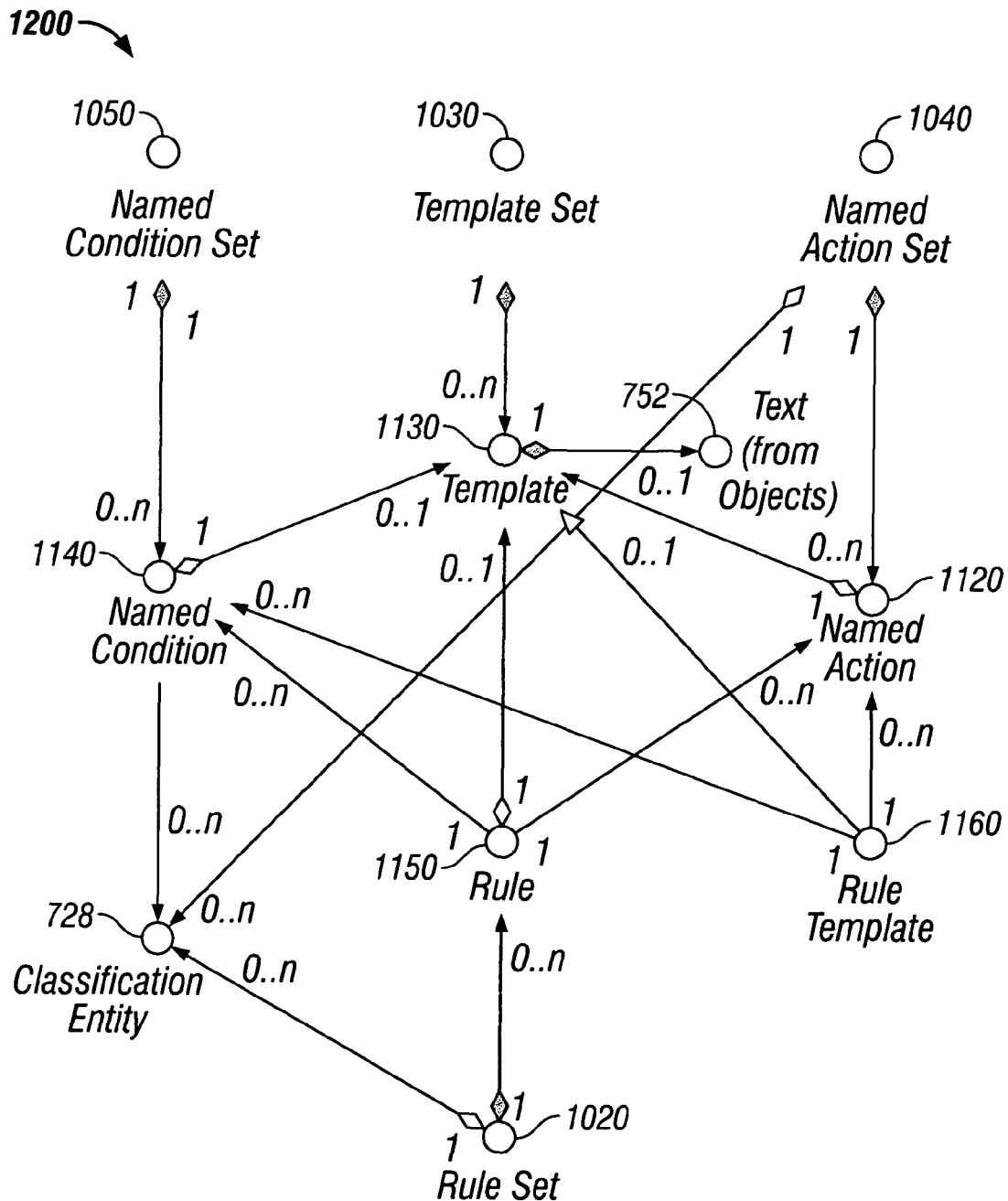

FIG. 12 illustrates a relationship between rule entities for data conveyance management.

Figure 13:
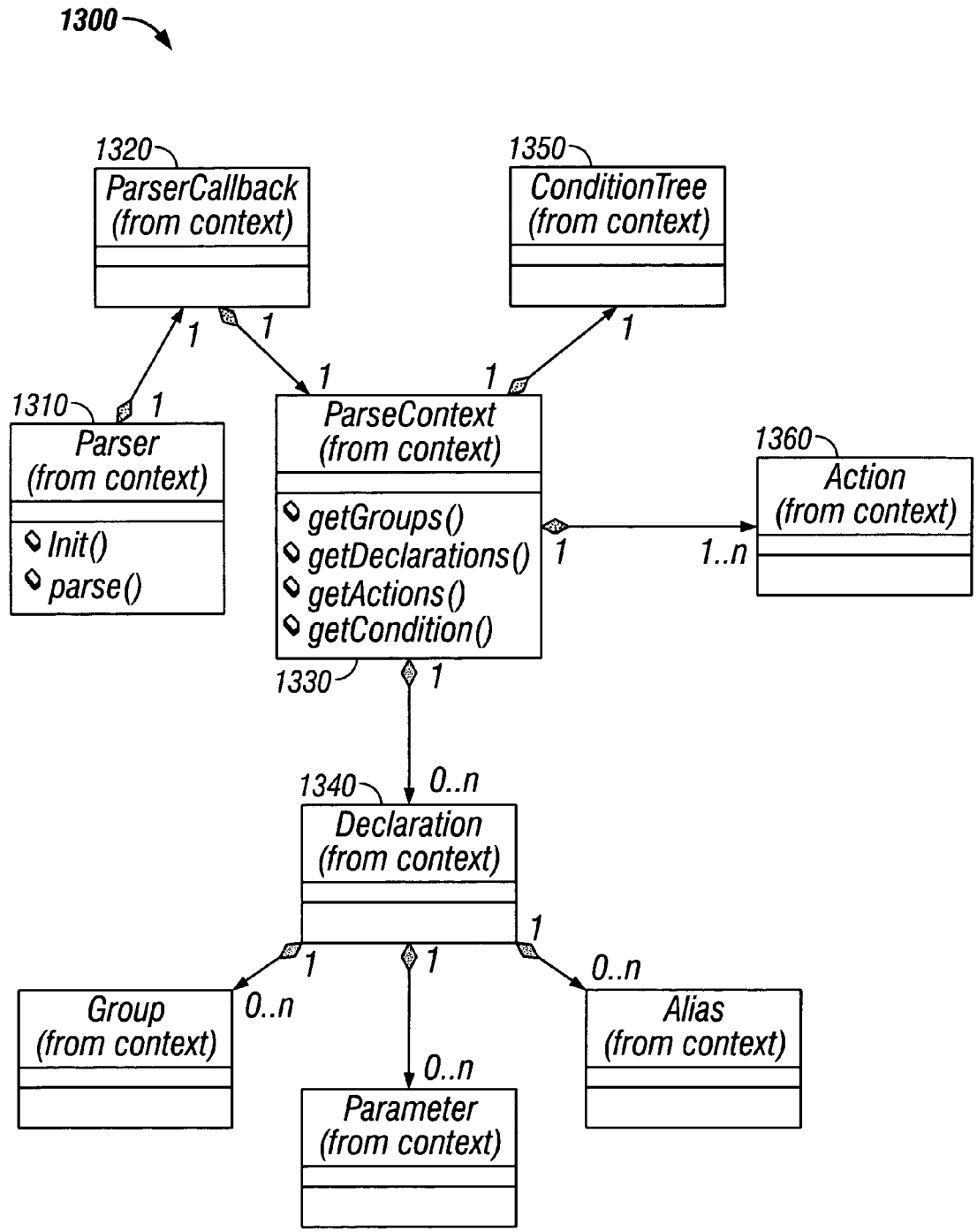

FIG. 13 illustrates a parsing model for data conveyance management.

Figure 14:
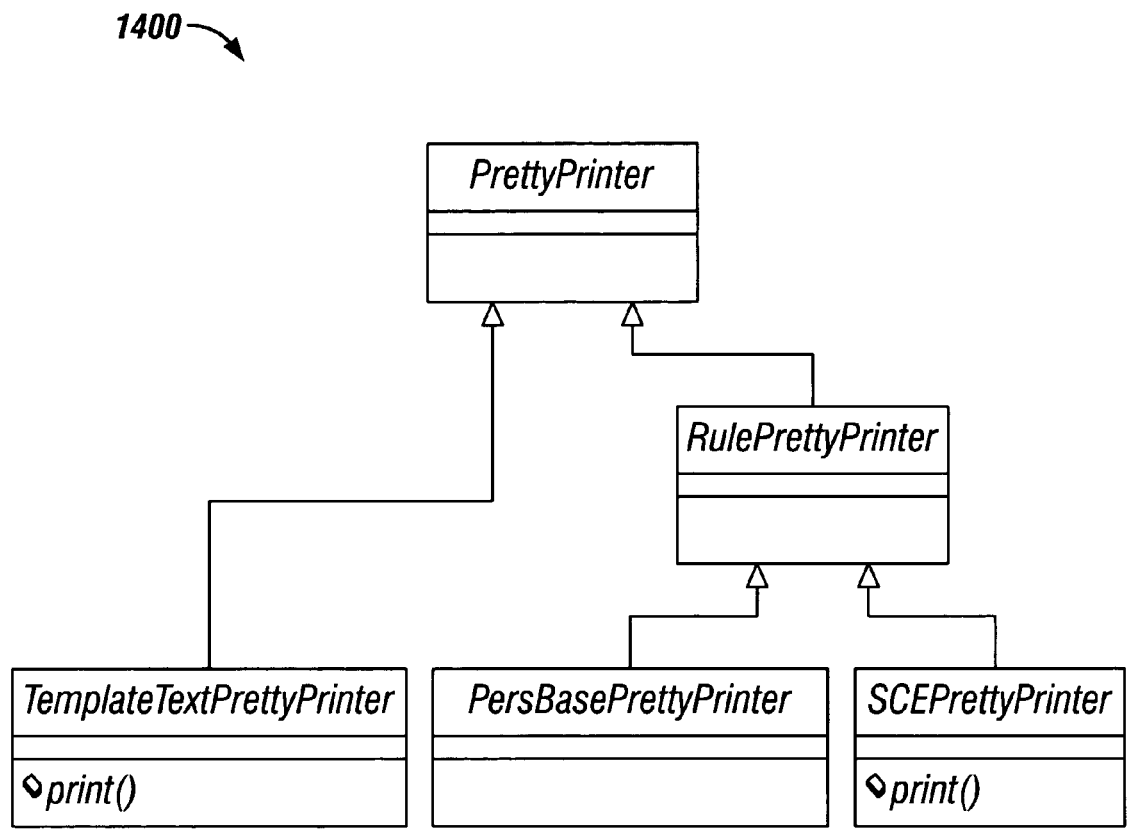

FIG. 14 illustrates class relations for printing.

Figure 15:
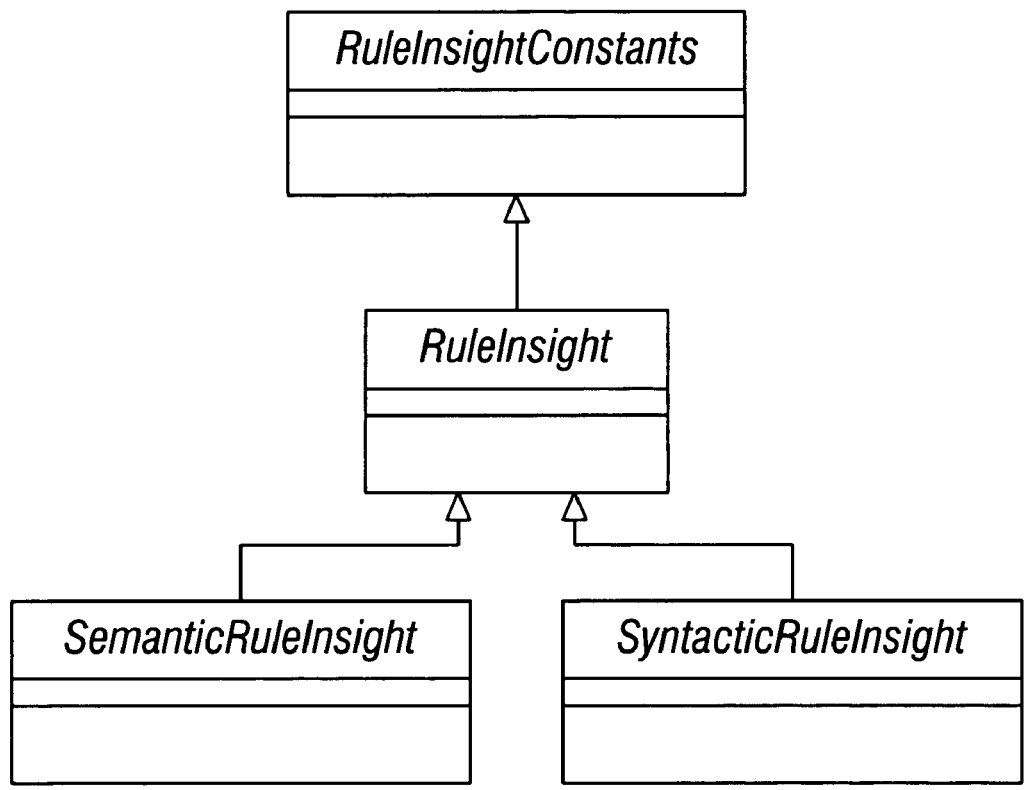
Figure 15:
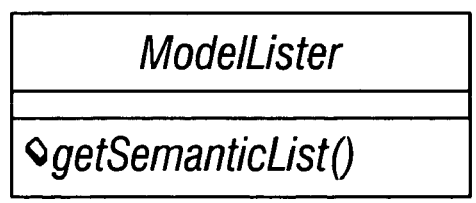

FIG. 15 illustrates class relations for user assistance.

Like reference symbols in the various drawings indicate like elements.

DETAILED DESCRIPTION

The systems and techniques described here relate to conveying data between computing devices. In particular, these systems and techniques relate to the management of data conveyance rules for rule engines, which use the rules to determine how, when, and/or under what conditions to send data to devices that they are serving. In general, however, the systems and techniques are applicable to programming any type of rule-driven data distribution device.

Figure 1:
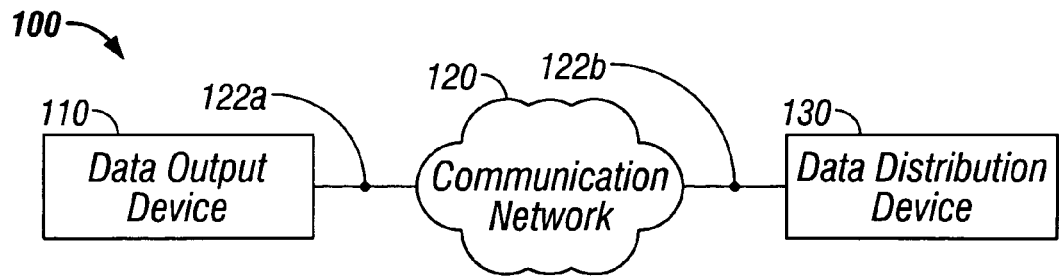
FIG. 1 shows a block diagram of a system for data conveyance management.

FIG. 1 illustrates a system 100 for data conveyance management. In general, system 100 includes a data output device 110, a communication network 120, and a data distribution device 130. In particular implementations, data output device 110 is a personal computer (PC) and data distribution device 130 is a server that may enter into a client-server relation over network 120, which may be the Internet. In operation, data distribution device 130 is receiving and/or generating data that may be of interest to data output device 110 or a user thereof. The data distribution device uses a set of rules to determine whether to convey the data to data output device 130, where the data may be analyzed, provided to a user, or otherwise utilized. The data conveyance rules may be modified to affect the delivery of the data.

Data output device 110 includes devices for storing, manipulating, and conveying data. For example, the device may include memory, which may include random access memory (RAM), read-only memory (ROM), compact-disk read-only memory (CD-ROM), registers, and/or any other appropriate volatile or non-volatile information storage device. The memory may store the conveyed data, instructions for the data output device, and/or any other appropriate information. The conveyed data may be text, audio, graphics, video, statistics, measurements, and/or any other appropriate information. As another example, device 110 may include a processor, such as, for example, an analog processor, a digital processor, a biological processor, or any other appropriate device for manipulating information in a logical manner. The processor may operate in accordance with instructions stored in memory. As a further example, device 110 may include a communication network interface, such as, for example, a network interface card, a modem, a wireless transceiver, or any other appropriate device for sending and/or receiving information. Data output device 110 may also include a device for providing data to a user, such as, for example, a display device, an audio device, a tactile device, or any other appropriate device for providing information to a user. In particular implementations, device 110 may be a personal digital assistant (PDA), a personal computer (PC), a workstation (WS), or any other appropriate computing device.

Data output device 110 and data distribution device 130 are coupled to communication network 120 by links 122. Links 122 may be metallic wire, such as for example, twisted-pair wire, or coaxial cable, fiber-optic cable, an electromagnetic wireless channel, such as, for example, an IEEE 802.11 channel, a Bluetooth™ channel, a cellular channel, or an infrared channel, and/or any other appropriate type of wireline or wireless path for conveying information.

Communication network 120 may include any appropriate devices for conveying information between data output device 110 and data distribution device 130. For example, network 120 may include bridges, routers, switches, servers, repeaters, transceivers, and/or hubs. Furthermore, these components may use wireline and/or wireless techniques. In general, network 120 may be any type of communication network, such as, for example, a frame relay network, an X.25 network, the Internet, or the Public Switched Telephone Network (PSTN). Note that communication network 120 may convey information between a variety of devices such as PCs, WSs, servers, and telephones contemporaneously with conveying data between data output device 110 and data distribution device 130.

Data distribution device 130 includes devices for storing, manipulating, and conveying data. For example, data distribution device 130 may include memory, which may include RAM, ROM, CD-ROM, registers, and/or any other appropriate volatile or non-volatile information storage device. The memory may store data, whether to be conveyed or not, instructions for the data distribution device, the state of the data output device, and/or any other appropriate information. The data may be created by device 130, received through communication network 120 from other devices, or otherwise captured at data distribution device 130. As another example, device 130 may include a processor, such as, for example, an analog processor, a digital processor, a biological processor, or any other appropriate device for manipulating information in a logical manner, and a communication interface, such as, for example, a network interface card, a modem, a wireless transceiver, or any other appropriate device for sending and/or receiving information. In particular implementations, data distribution device 130 may be a server and enter into a client-server relation with data output device 110.

Data distribution device 130 and data output device 110 may communicate using any appropriate standard. For example, communications between a Web-server and a database may be performed using ANSI-SQL over Java Database Connectivity (JDBC) (as an API).

In one mode of operation, data output device 110 sends a message to data distribution device 130 through communication network 120 requesting modification of the rules for conveying data to data output device, which may present the data to a user. The rules may be identified by a name, a number, a user name, a data output device identifier, or any other appropriate identifier. Note that a message may have one or more segments and/or be part of a larger message and that a user may typically use any appropriate data output device for receiving data.

In response to the message, data distribution device 130 identifies a set of rule templates associated with rules. A rule template is basically a rule with an unspecified parameter substituted for at least one of the rule's attributes. The data distribution device then generates a message specifying a user interface corresponding to the set of rule templates and sends the message to data output device 110. In particular implementations, a natural language description for each of the rule templates may also be sent. The description may, for example, relate to the function (e.g., product promotion) of a rule created with the template.

The data output device then generates a user interface corresponding to the set of rule templates, visually presents the user interface, and awaits user selection of one of the rule templates. The user selection may be detected by any appropriate user input device. Upon detecting selection of one of the rule templates, data output device 110 sends a message to data distribution device 130 regarding the selected rule template.

Data distribution device 130 then identifies parameters for the selected rule template, the parameters being the portions of the rule template that have not been specified, and generates a message specifying a user interface corresponding to the selected rule template and identified parameters. Device 130 then sends the message to data output device 110. In general, parameters may be rule template portions that vary from implementation to implementation. In particular implementations, a natural language description of the parameters may also be sent.

Noted above, a rule template is a rule in which parameters have not been specified. In general, a rule is a combination of actions that need to be executed upon the occurrence of certain conditions and the conditions that trigger this set of actions. For example, if a seller wants to promote certain products based on information available, the seller may use a rule similar to the following:

```
IF
(Customer.CustomerType = "GOLD" and
ShoppingBasket.ProductCategory = "HITECH")
THEN
{
Promote ("HANDHELD");
}.
```

In this example, the combination of the customer type and the product category of the item to be purchased are used to determine what type of item to promote to the customer. A rule template could be created for this rule by using parameters for the customer type, the product category, and the promoted item. Such a rule template may look like this:

```
IF
(Customer.CustomerType = ?custType and
ShoppingBasket.ProductCategory = ?prodCategory)
THEN
{
Promote (?products);
},
``` where ?custType, ?prodcategory, and ?products are parameters that need to be specified for a rule to be created. Data conveyance rules and rule templates will be discussed in more detail below.

Upon receiving the message, data output device 110 generates a user interface corresponding to the selected template and the parameters and visually presents the user interface. Device 110 then waits for a user to specify the parameters. Specifying a parameter may include providing a numeric value for the parameter, specifying a text string for the parameter, specifying a logical condition for the parameters (e.g., true or false), or any other appropriate delineation.

After all of the parameters for the selected template have been specified, the specifications may be sent to data distribution device 130. The data distribution device may then create a rule by binding the template with the specified parameters and update the rules for the user with the new rule.

When data output device 110 registers with data distribution device 130, distribution device 130 determines whether any rules for sending data to device 110 exist. This determination may be based on a user identifier, an output device identifier, or any other appropriate identifier. If such rules exist, output device 130 begins to analyze available data, created and/or received, to determine whether any satisfies the conditions in the rules. In particular implementations, a persistent connection may be established between the data distribution device and the data output device, with the data distribution device providing a handle, sometimes referred to as a response object in servlet technology, to convey the data.

If any data satisfies the conditions, distribution device 130 sends the data to output device 110. The data may be sent without waiting for a request from the data output device, possibly by the use of push techniques. The data service may be implemented using an Applet with Remote Method Invocation (RMI) or Common Object Request Broker Architecture (CORBA), Active X components, Java and Java Server Pages (JSPs), or any other appropriate type of language/protocol.

The system illustrated by FIG. 1 and described above may have a variety of features. For example, because the rules for conveying data to a data output device user may be modified, a user may control the type of data sent to him/her. Furthermore, a business person may specifically target certain customers to which data about products and/or services should be sent.

In certain implementations, the data for creating rules (e.g., the templates and parameters) may be sent to the data output device at one time. Moreover, in some implementations, the rules may be edited from points other than a data output device. Furthermore, a data output device may not have rule editing capability.

In particular implementations, the templates may be organized into template types. Examples of template types may include product promotion, weather forecasts, and stock market updates. A user may then select between template types and have the different rule templates for that template type presented.

The techniques may be used for any type of application where a data distribution device wants to update a data output device—periodically, aperiodically, or otherwise—about new state changes. Some applications include Web chat, stock quotes, dynamic auction applications, dynamic advertisement (e.g., pushing the promotions to the client based on the client's profile and/or behavior), travel information updates, and Webinar (i.e., Web seminars).

In certain implementations, the conditions of the rules are tied to events and/or situations that occur in applications. For example, in an Internet Sales application, an event could be the addition of a product to a shopping basket. Moreover, the conditions may be tied to any state that a computing device can appreciate. Thus, the rules are applicable to conditions that occur in data, applications, or otherwise.

In particular implementations, the data distribution device may maintain the state of the data output device and, thus, be able to provide the data output device with only new data. On the data output device side, the data may need to be kept persistent across the trips. One way to accomplish this persistency is to have one frame continually refreshing to obtain the new data, if any, and passing the obtained information to the other interested frames. In a non-frame scenario, the data output device may need to refresh the interface by obtaining the previously obtained responses as well as the new ones.

Figure 2:
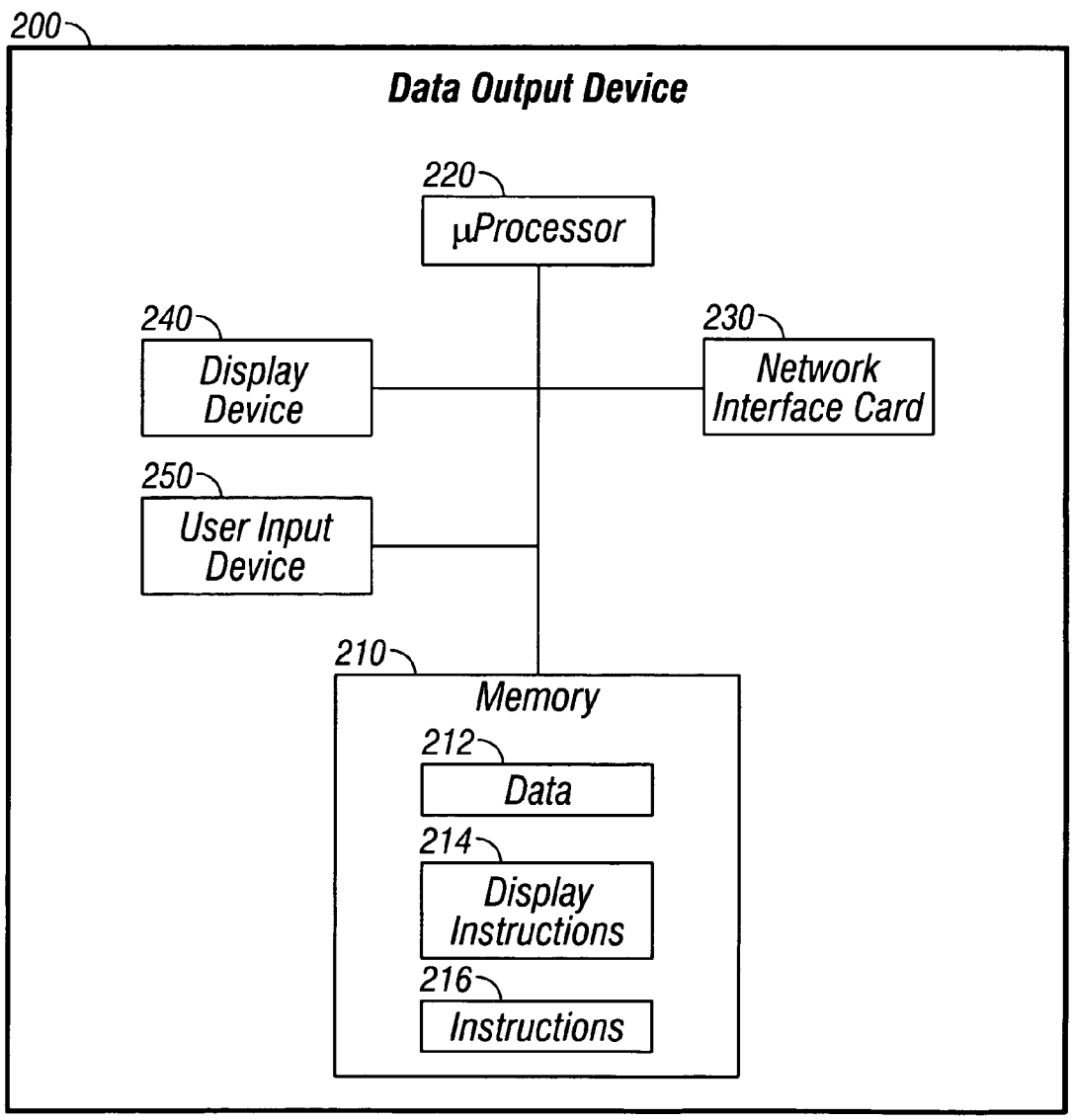
FIG. 2 shows a block diagram of a data output device.

FIG. 2 illustrates a data output device 200, which may be similar to data output device 110 in FIG. 1. As illustrated, data output device 200 includes memory 210, a microprocessor 220, a network interface card 230, a display device 240, and a user input device 250.

Memory 210 may include RAM, ROM, CD-ROM, registers, and/or any other appropriate volatile or non-volatile information storage device. Memory 210 stores conveyed data 212, display instructions 214, which dictate how the data is to be displayed, and instructions 216, which dictate the lower level operations for the device. In particular implementations, display instructions 214 may be a Web-browser.

Microprocessor 220 may be a complex-instruction-set computer (CISC), a reduced-instruction-set computer (RISC), or any other appropriate device for manipulating information in a logical manner. Microprocessor 220 operates according to the instructions in memory 210.

Network interface card 230 may be an Ethernet card, an Asynchronous Transfer Mode (ATM) card, or any other appropriate type of device for exchanging information with a communication network. Card 230 may operate in conjunction with or independent of microprocessor 220.

Display device 240 may be a cathode ray tube (CRT) display, a liquid crystal display (LCD), a projector, or any other appropriate device for visually presenting information. Display device 240 may present user interfaces generated by microprocessor 220.

User input device 250 may be a keypad, a keyboard, a touch screen, a trackpad, a mouse, a microphone, a stylus, and/or any other appropriate device for detecting input from a user. Through the user input device, a user may enter commands for microprocessor 220.

In one mode of operation, if microprocessor 220 determines that modifications are required for rules for conveying data to the device, the microprocessor generates a message requesting modification of the rules and sends the message through network interface card 230, from which the message may be conveyed to a data distribution device. Determining whether modifications are required for the rules may, for example, be accomplished by detecting a user command indicating that the rules are to be modified.

Data output device 200 then waits to receive a message specifying a user interface corresponding to a set of rule templates. In particular implementations, the message may also contain a natural language description for each of the rule templates. The microprocessor then generates the user interface corresponding to the rule templates, which display device 240 visually presents, and awaits user selection of one of the rule templates.

Upon detecting user selection of one of the rule templates, the data output device generates a message regarding the selected rule template and sends the message through network interface card 230. The data output device then waits for a message specifying a user interface corresponding to parameters for the selected rule template.

Upon receiving the message, microprocessor 220 generates a user interface corresponding to the parameters, and the display device visually presents the user interface. The data output device then waits for a user to specify the parameters. After all of the parameters for the selected rule template have been specified, the data distribution device generates a message containing the specifications and sends the message through network interface card 230.

When data is desired by a user, microprocessor 220 generates a user interface for display by using display instructions 214. Display device 240 then visually presents the user interface to the user. Determining that data is required may be accomplished by detecting a user command indicating that a certain type of data is desired, determining that an application desires a certain type of data, or by any other appropriate technique. The microprocessor also generates a subscription request. The subscription request may contain information regarding the type of data that is desired, the source of the data, and/or any other appropriate identifying information. The request may then be sent through network interface card 230 to a data distribution device.

Microprocessor 220 then, possibly with the assistance of network interface card 230, establishes a connection. The microprocessor then waits to receive data through network interface card 230. Once data has been received, the microprocessor updates the previously received data, if any. Furthermore, the microprocessor may update the user interface presented by display device 240 with the new data. The microprocessor may continue to receive and update the data until the connection is broken by the data output device or the serving data distribution device.

FIG. 2 illustrates only one example of a data output device. Other data output devices may have fewer, additional, and/or a different arrangement of components. For example, a data output device may include an audio device for providing data to a user. Moreover, if a data output device includes an audio device, the device may or may not include a display device. Additionally, although memory 210 is illustrated as having several segments, it should be understood that memory 210 may have less or more segments. For example, display instructions 214 could be part of instructions 216. As another example, some of the instructions could be encoded on the microprocessor. Furthermore, instructions 216 may include a variety of applications.

Figure 3:
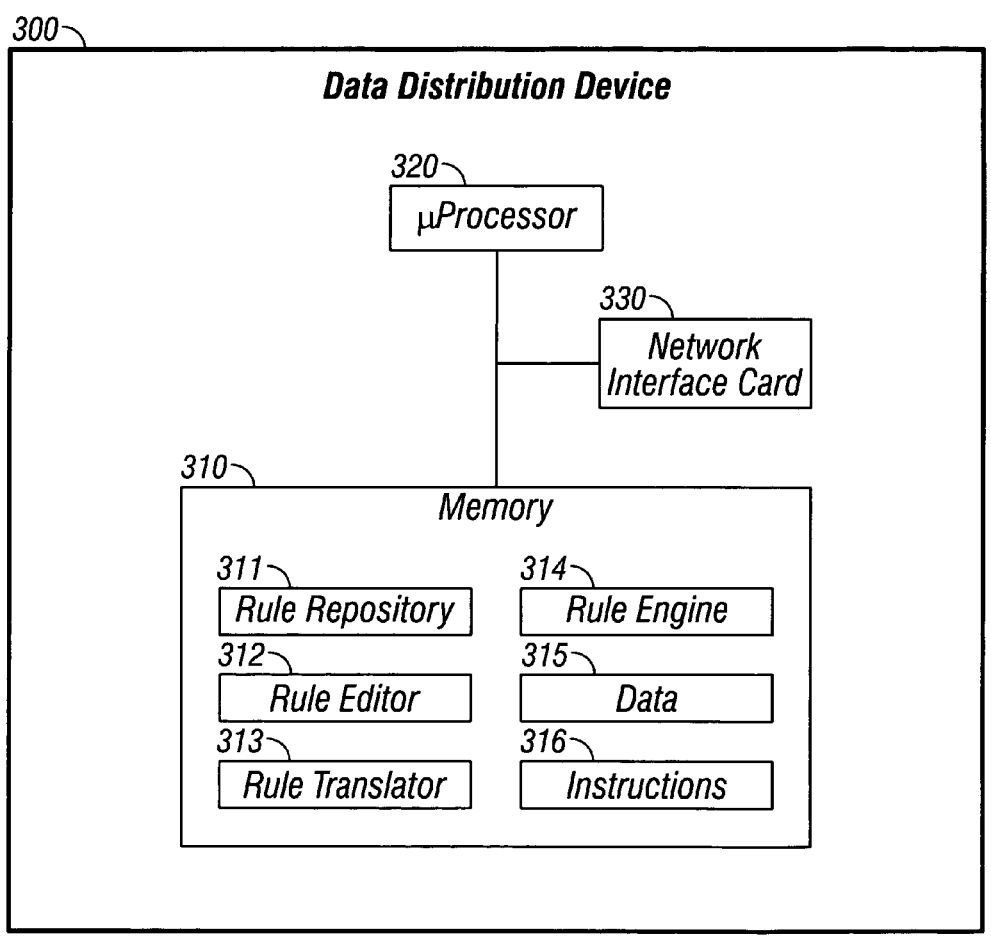
FIG. 3 shows a block diagram of a data distribution device.

FIG. 3 illustrates a data distribution device 300, which may be similar to data distribution device 130 in FIG. 1. As illustrated, data distribution device 300 includes memory 310, a microprocessor 320, and a network interface card 330.

Memory 310 may include RAM, ROM, CD-ROM, registers, and/or any other appropriate volatile or non-volatile information storage device. Memory 310 stores rule repository 312, rule editor 312, rule translator 313, rule engine 314, data 315, and instructions 316. Rule repository 311 contains the rules for determining when to send data to a data output device and the rule templates, from which rules may be created. Rule repository 311 may be a relational, hierarchical, or flat database or any other logical association of information. Rule editor 312 is responsible the editing of the rules in rule repository 311, and rule translator 313 is responsible for translating edited rules into a format acceptable for rule engine 314. Translated rules may be stored in rule repository 311. Rule engine 314 may be Jrules from ILOG, Jess from Sandia, SCE from SAP, or any other appropriate rule implementation scheme. Data 315 includes data that may or may not be of interest to a data output device. Instructions 316 dictate the lower-level operations of device 300.

Microprocessor 320 may be a CISC, a RISC, or any other appropriate device for manipulating information in a logical manner. Microprocessor 320 operates according to the instructions in memory 310.

Network interface card 330 may be an Ethernet card, an ATM card, or any other appropriate type of device for exchanging information with a communication network. Card 330 may operate in conjunction with or independent of microprocessor 320.

In one mode of operation, the data distribution device waits to receive a message through network interface card 330 requesting modification of the rules for conveying data to a data output device. In response to receiving such a message, microprocessor 320, according to the instructions in rule editor 312, generates a message specifying a user interface corresponding to a list of rule templates, which are contained in rule repository 311. The message is then sent through network interface card 330 to the data output device requesting modification. In particular implementations, the message may also include a natural language description for each of the rule templates. The data distribution device then waits for a message regarding a selected rule template. Upon receiving such a message, microprocessor 320 generates a message specifying a user interface corresponding to the selected template's parameters, which are stored in rule repository 311, and sends the message through card 330.

The data distribution device then waits to receive a message containing specifications for the parameters. The specified parameters are then bound with the rule template to create a new rule. The rule may then be translated into a format appropriate for rule engine 314 by rule translator 313 and stored in rule repository 311.

When a data output device registers with data distribution device 300, microprocessor 320, according to the instructions in rule engine 314, determines whether any rules exist in rule repository 311 for sending data to the data output device. If such rules do exist, microprocessor 320 begins to analyze data 315 to determine whether any data satisfies the rule conditions.

If appropriate data exists, microprocessor 320 generates a message including the data. The message is then sent to the subscribing data output device through network interface card 330. Note that data distribution device 300 may be repeatedly receiving and/or creating data and, thus, may continue analyzing whether appropriate data exists.

FIG. 3 illustrates only one example of a data distribution device. Other data distribution devices may have fewer, additional, and/or a different arrangement of components. For example, a data distribution device may have a user input device and display device to allow a user at the data distribution device to modify the rules in the rule repository. Additionally, although memory 310 is illustrated as having several segments, it should be understood that memory 310 may have fewer or more segments. For example, rule editor 312 and rule translator 313 could be part of the same application. Furthermore, some of the instructions could be encoded on the microprocessor. As another example, data 315 could have different segments depending on the type of data and/or the destination of the data. Furthermore, instructions 316 may include a variety of applications.

Figure 4:
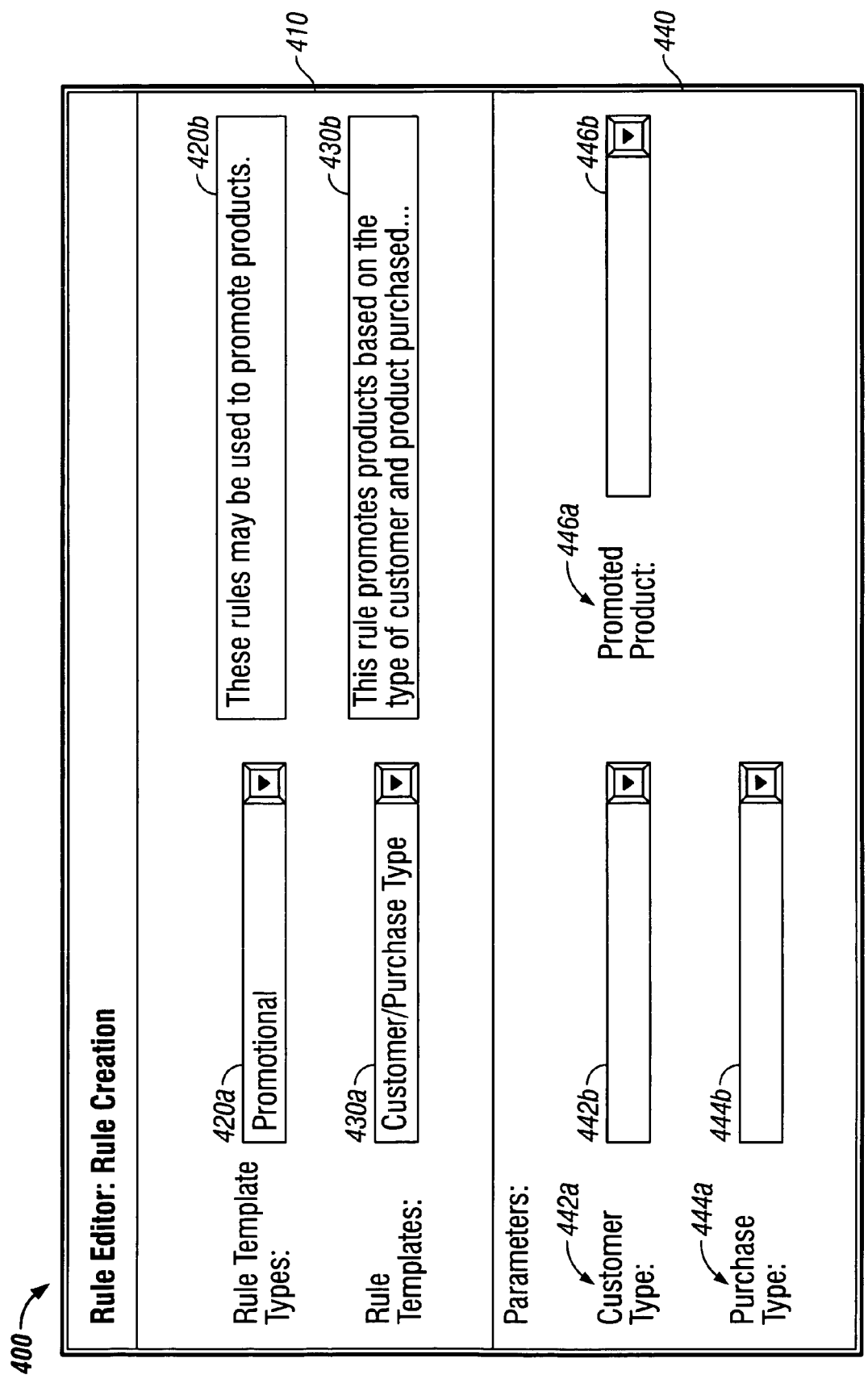
FIG. 4 illustrates a user interface for data conveyance management.

FIG. 4 illustrates a user interface 400 for data conveyance management. User interface 400 may, for example, be displayed by data output device 110 in FIG. 1.

User interface 400 includes a template portion 410 and a parameter portion 440. template portion 410 includes a template type selection portion 420 and a template selection portion 430. Using template type selection portion 420, a user may select a type of template for creating a rule. As illustrated, the selection may be made by the use of pull-down menu 420a. In other implementations, however, the selection may be made by any other appropriate technique. Additionally, a natural language description of the template type appears in box 420b. Thus, a user can readily understand the different types of templates.

After selecting a type of template in portion 420, a user may select a template in portion 430. As illustrated, the selection may be made by the use of pull-down menu 430a, although the selection may be made by any other appropriate technique in other implementations. Note that menu 430a may not be populated until a template type is selected in pull-down menu 420a. Additionally, a natural language description of the template appears in box 430b. Thus, a user can readily understand the different templates for the template type.

Once a template has been selected, the parameters of the template may be specified in portion 440. Note that portion 440 may not be populated until the template is selected in menu 430a. As illustrated, the template selected in portion 410 has three parameters that need to be specified. The parameters are described by appropriate names 442a-446a and may be specified using pull-down menus 442b-446b.

Although FIG. 4 illustrates a user interface for data conveyance management, other implementations may have less, more, and/or a different arrangement of information. For example, the parameters may not be specified in the same user interface in which the template is selected. As another example, a user interface may also have natural language definitions for the parameters. As a further example, a user interface may report errors in the template selection process and/or parameter specification process.

Figure 5:
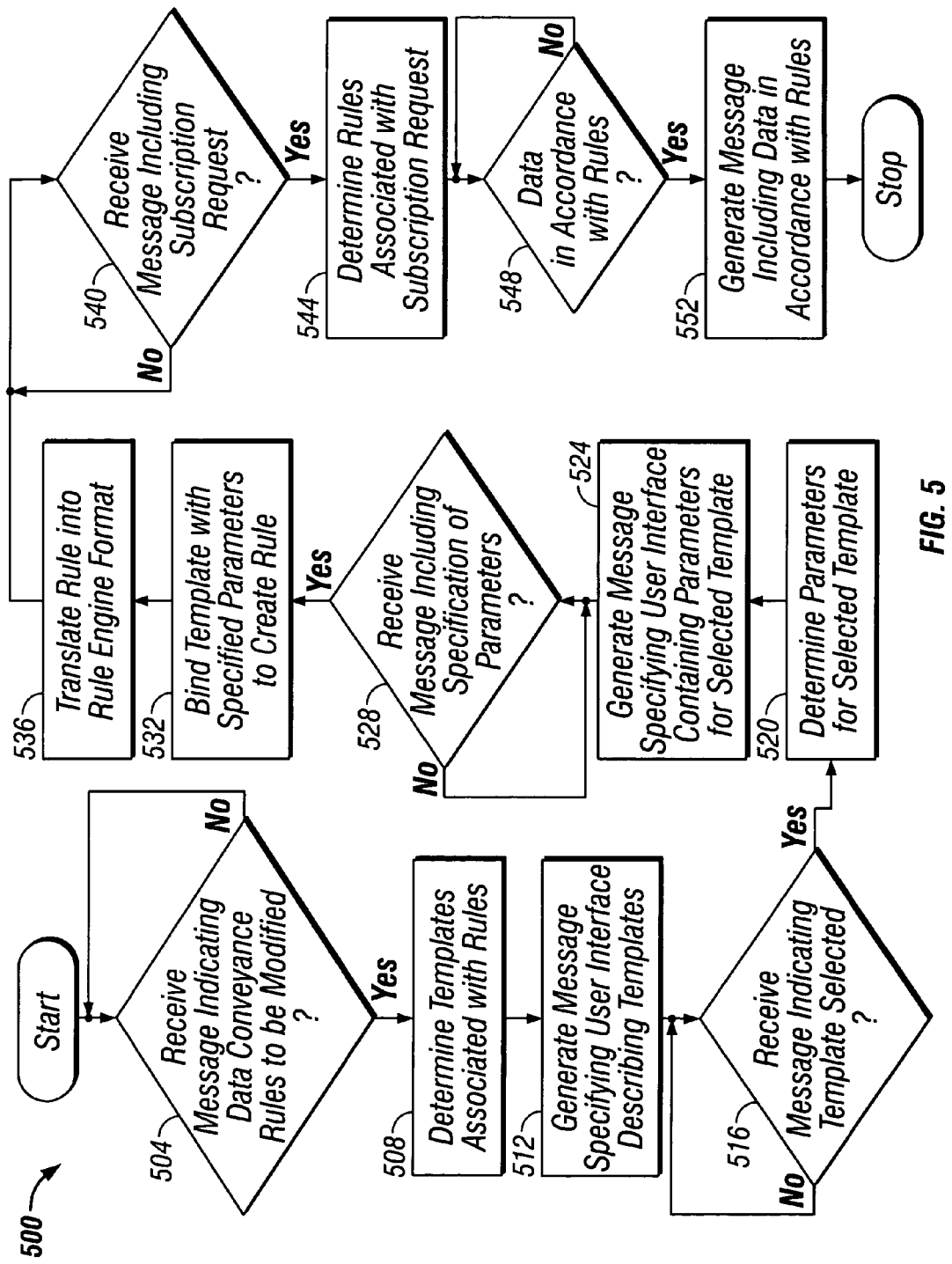
FIG. 5 is a flow chart of a process for data conveyance management.

FIG. 5 is a flow chart illustrating a process 500 for data conveyance management. Process 500 may be implemented by a data distribution device similar to data distribution device 130 in FIG. 1.

The process begins with waiting to receive a message indicating that data conveyance rules are to be modified (step 504). The rules to be modified may be associated with a user, a data output device, or otherwise.

Once such a message has been received, the process continues with identifying rule templates associated with the rules to be modified (step 508). The templates may be stored in and retrieved from a repository and may be for the rules themselves and/or for rules associated with the rules to be modified. The templates may be associated with the rules apriori, based upon common attributes of the rules and the rule templates, and/or by any other appropriate technique. After this, the process calls for generating a message specifying a user interface corresponding to the rule templates (step 512). The user interface may include a natural language description of the templates' functions. The message may then be sent to the device that initiated the rule modification message.

The process then calls for waiting to receive a message indicating that a rule template has been selected (step 516). Upon receiving such a message, the process continues with identifying parameters for the selected template (step 520). The parameters may be identified by parsing a template, by examining a parameter list associated with a template, or by any other appropriate technique. The process then calls for generating a message specifying a user interface corresponding to the selected template and the parameters for the selected template (step 524). The message may contain a natural language definition of the template's parameters. The message may then be sent to the initiating device.

After this, the process calls for waiting to receive a message including specification of the parameters (step 528). Upon receiving such a message, the process calls for binding the template with the specified parameters to create a rule (step 532). The rule may then be stored with the other rules in a repository.

The process continues with translating the rule into a rule engine format (step 536) and waiting to receive a message including a subscription request (step 540). This message may come from any appropriate data output device.

Upon receiving a subscription request, the process calls for identifying rules associated with the subscription request (step 544). The rules may be associated with the subscription request based on the requesting data output device, the data output device user, or otherwise. After identifying the rules associated with the subscription request, the process continues with waiting for data in accordance with the rules (step 548). Once such data exists, the process calls for generating a message including the data (step 552). The message may then be sent to the requesting data output device.

Although FIG. 5 illustrates a process for data conveyance management, other processes for data conveyance management may have fewer, more, and/or a different arrangement of operations. For example, the parameter specifications may arrive individually. Thus, the process may have to wait for all of the specifications to be received before binding the parameters with the template. Furthermore, parameter specifications may be checked when they arrive to make sure that they are acceptable. Moreover, a template may have only one parameter. As another example, the parameters may be sent with the initial user interface for the templates. Moreover, the specified parameters may be sent with the indication of the selected template. As a further example, the receipt of the subscription request and sending of data in accordance with the rules may be performed at a time that is disjoint from the parameter specification and binding and/or may be performed at an entirely different data distribution device. Also, data may be sent to the requesting data output device once, periodically, aperiodically, or otherwise.

Figure 6:
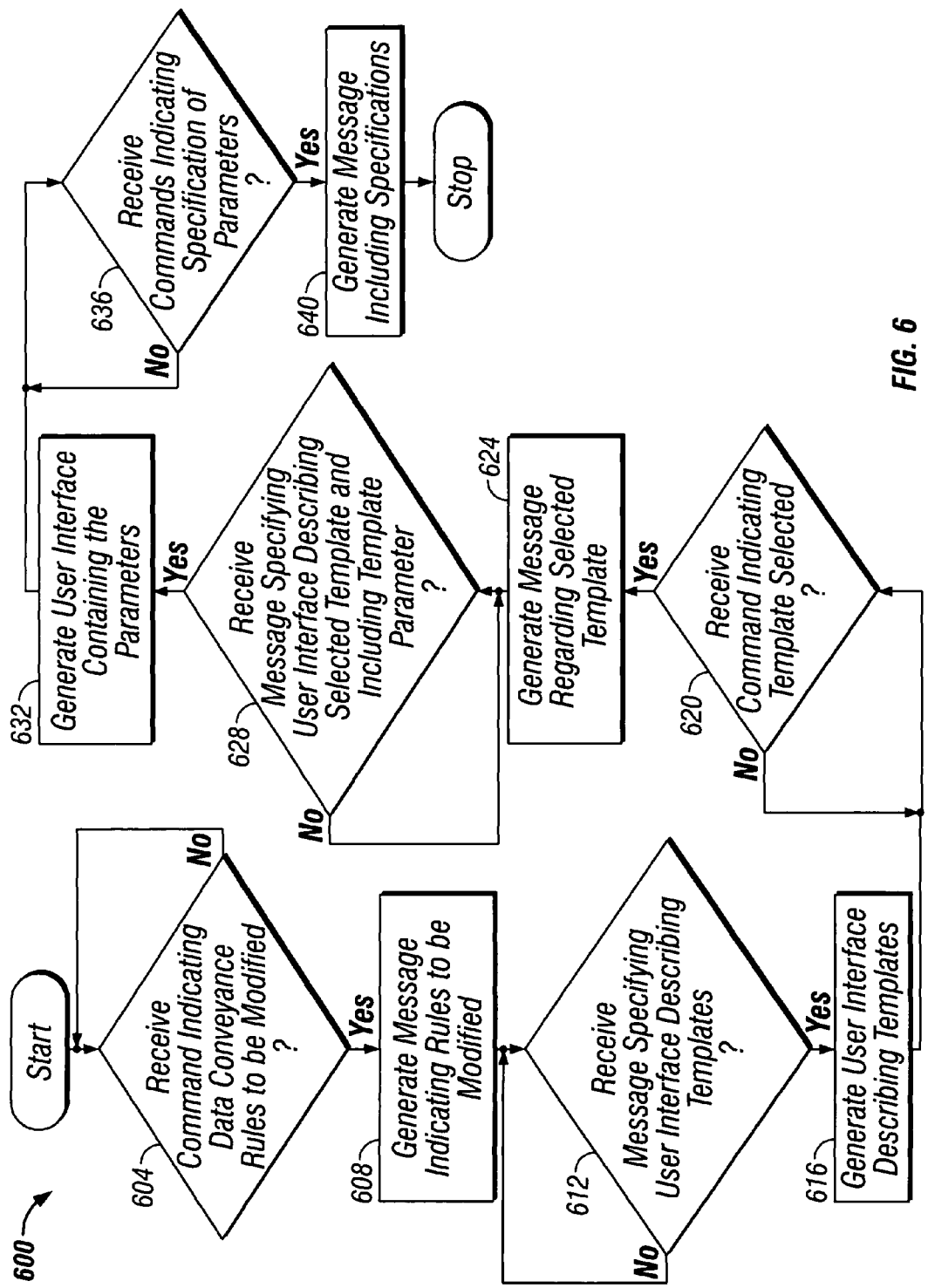
FIG. 6 is a flow chart of a process for data conveyance management.

FIG. 6 illustrates a process 600 for data conveyance management. Process 600 may be implemented by a data output device similar to data output device 110 in FIG. 1.

The process begins with waiting to receive a command indicating that data conveyance rules are to be modified (step 604). Such a command could come from a data output device user, a network administrator, or otherwise and may be received through any appropriate user input device. The rules may be associated with a user, a data output device, or otherwise.

Once such a command has been received, the process continues with generating a message indicating that data conveyance rules are to be modified (step 608). The message may identify the rules to be modified by including a user name, a device number, or other appropriate identifier. The message may then be sent to a data distribution device.

The process continues with waiting to receive a message specifying a user interface corresponding to rule templates (step 612). The user interface may include a natural language description of the templates' functions. After this, the process calls for generating the user interface (step 616). The user interface may then be presented to a user.

The process then calls for waiting to receive a command indicating that a rule template has been selected (step 620). Upon receiving such a command, the process continues with generating a message regarding the selected template (step 624). The message may then be sent to a data distribution device.

The process continues with waiting to receive a message specifying a user interface corresponding to the selected template and parameters for the selected template (step 628). The user interface may include natural language definitions of the parameters. Upon receiving such a message, the process calls for generating the user interface (step 632). The user interface may then be displayed to a user.

After this, the process calls for waiting to receive commands indicating specification of the parameters (step 636). The specification may be numerical values, text, logical conditions, or other identifiable entities. Upon receiving such commands, the process calls for generating a message including the specifications (step 640). The message may then be sent to a data distribution device, and the process is at an end.

Although FIG. 6 illustrates a process for data conveyance management, other processes for data conveyance management may have fewer, additional, and/or a different arrangement of operations. For example, the parameter specifications may be in individual messages. Moreover, a rule template may have only one parameter. As another example, the parameters may be received with the initial descriptions of the rule templates. Furthermore, the specified parameters may be sent with the indication of the selected template. As an additional example, data may be requested and received through the use of a subscription request.

A particular implementation of data conveyance rules, their personalization, and their translation for rules engines is discussed in detail below in the context of business rules for applications. Even within the discussion of this particular implementation, however, alternatives will be suggested. Moreover, a variety of other alternatives exist.

As mentioned previously, rules are defined as a combination of actions that need to be executed under certain conditions and the conditions that trigger this set of actions. Conditions, for example, may be the result of an application being in a specific state and matching certain business criteria. An action may be defined as the resultant of what needs to be done as a result of certain conditions occurring. Conditions and actions are defined in a rule, generated by a rule engine. A rule, however, may be transferred to the host application for interpretation.

An example application is Shopping Basket in an Internet Sales application. Shopping Basket has various associated events and states, such as the basket is empty or the basket has had an element added. Given the situation and the past history of the current session of the user, the seller might want to be promoting certain products based on the information available. As mentioned previously, a relatively simple rule could look like:

```
IF
    (Customer.CustomerType = „GOLD" and
    ShoppingBasket.ProductCategory = „HITECH")
Then
{
    Promote(„HANDHELD");
}.
```

Business rules may be grouped in business rulesets. A ruleset is a set of business rules logically grouped together. A business ruleset may provide the following added functionality: 1) it may deploy as a whole; and/or 2) it may share cross-rule data. These abilities may vary depending on the target rule engine. For example, Internet Pricing and Configuration (IPC) shares data in a ruleset and can deploy all rulesets only. Jrules, however, shares data within a ruleset and can deploy only a ruleset as a whole and then deploy individual rules, if required.

As an example of a ruleset, a seller may want to group together all rules pertaining to a particular season, winter, for example, as a ruleset: Winter Ruleset. This ruleset can be deployed only in winter and not in any other season by the administrator for the Web-site.

Business rules may be formed out of rule templates. A rule template is a rule that is defined with placeholders, or parameters. The fundamental premise on which templates are based is for reuse of the same rule code, but with different parameter specifications.

For example, as an alternative to the rule defined above, consider the following:

```
IF
    (Customer.CustomerType = „SILVER" and
    ShoppingBasket.ProductCategory = „HITECH")
Then
{
    Promote(„HANDHELDLOWER");
}.
```

Here, the seller wants to promote the "HANDHELD-LOWER" set of products to a silver customer in the scenario that the shopping basket has a "HITECH" product. The only thing that differs in the two rules are the values for customer type and promoted product. Thus, the same rule type could be reused across various divisions with different people writing the actual rule based on their division guidelines.

Generically, the two rules could be written as:

```
IF
    (Customer.CustomerType = ?custType and
    ShoppingBasket.ProductCategory = ?prodCategory)
Then
{
    Promote(?products);
}.
```

In this case, ?custType, ?prodCategory, and ?products are parameters that would be specified by different people to generate logically the same, but actually different rules. A rule, therefore, is a template with all parameters bound.

Typically, a rule may be based off one and only one template. That is, a rule may not be based on more than one template. In addition, the template off which a rule is based may not exist, as templates are independent entities. Of course, in some implementations, it may be that rules are based off more than one template. If a rule is based off a template, the rule is valid if all the parameters of the template have been specified. If any of the parameters is not specified, the rule cannot be deployed.

Similar to rules, templates may also be grouped. A rule templateset is a logical grouping of templates. These could be based on industry, parameters, or any other category deemed fit by the user.

Based on the definition of business rules, business rules may have three components: 1) declarations; 2) conditions; and 3) actions. This componentization is based on rule syntax. A rule syntax is presented below with respect to this base grammar.

Declarations define what is to be used in the rule. Note that the component to be used should probably be in the object model of the Modeling Environment, referred to as the Model Entity. Declarations may be explicit or implicit. An explicit declaration results in an alias, which can be used in the rule instead of the type. Also, there may be multiple aliases for the same type of Model Entity. An implicit declaration is where the Model Entity is referred to directly. Referring to a Model Entity directly creates an implicit alias not directly visible to a user for use in rule actions. The same Model Entity always refers to the same implicit alias.

With regard to physical representation, at design time, declarations are part of the following entities: 1) source code; and 2) parse context. In the source code, they represent a logical section in the rules. Explicit declarations occur before being used and before the overall "Rule Body" starts. Implicit declarations may occur anytime in the conditions component. The syntax for explicit declarations may be as follows:

| rule_declaration | → | alias_declaration |
|---|---|---|
| alias_declaration | → | ALIAS |
| | | rule_type |
| | | AS |
| | | rule_alias |
| | | [ |
| | | (<COMMA> |
| | | rule_alias)+ |
| | | ] |
| rule_type | → | rule_name |
| rule_name | → | <IDENTIFIER> |
| | | [ |
| | | <DOT> |
| | | <IDENTIFIER> |
| | | ] |
| rule_alias | → | <IDENTIFIER>. |

At run time, declarations may be code in a rule engine such as SCE. At deployment, the declarations (both implicit and explicit) may be translated into a rule-engine rule-object section. Declarations may be stored as part of the rule source code.

Turning now to conditions, this component of a business rule defines the situations under which the set of actions are to be generated during application execution. A condition is typically a Boolean expression that evaluates to either TRUE or FALSE. A condition may have implicit declarations within its expressions.

With regard to physical representation, at design time, conditions are part of the source code and the parse context. In the source code, they represent a logical section in the rules. Physically, they occur after the declarations.

The syntax for conditions may be:

```
rule_condition          →    IF
                             expression
expression              →    boolean_expression
boolean_expression      →    boolean_and_expression
                             (
                             <OR>
                             boolean_expression
                             )*
boolean_and_expression  →    equality_expression
                             (
                             <AND>
                             equality_expression
                             )*
/*
```

Please note that distinction between numeric and symbolic expressions may be necessary here. This should happen semantically at the type-checking phase of the parser.

```
*/
equality_expression     →    relational_expression
                             (
                             (
                             <EQUAL>|<GE>|<LE>|<LT>|<GT>|<NE>
                             )
                             relational_expression
                             )*
relational_expression   →    multiplicative_expression
                             (
                             (
                             <PLUS>|<MINUS>
                             )
                             multiplicative_expression
                             )*
multiplicative_expression → unary_expression
                             (
                             (
                             <STAR>
                             |
                             <FSLASH>
                             )
                             unary_expression
                             )*
unary_expression        →    (
                             <PLUS>
                             |
                             <MINUS>
                             )
                             unary_expression
                             |
                             primary_expression
primary_expression      →    <LPAREN>
                             expression
                             <RPAREN>
                             |
                             literal
                             |
                             rule_variable
rule_variable           →    <TYPEIDENTIFIER>
                             |
                             rule_alias
literal                      <STRING_LITERAL>
                             |
                             <INTEGER_LITERAL>
                             |
                             <FLOATING_POINT_LITERAL>
                             |
                             <CHARACTER_LITERAL>
                             |
                             <TRUE>
                             |
                             <FALSE>.
```

At run time, conditions form the RETE NET algorithm in the SCE. During deployment, this section translates into the SCE rule: conditions section. Conditions are stored as part of the rule source code.

Actions form the logical rule body. These represent what the application should do when the conditions are met. In certain implementations, actions consist of: 1) action name; 2) action short description; 3) action long description; 4) action icon; and 5) action parameters. Most of these are straight forward. The action parameters, however, are of particular interest.

Action parameters may have: 1) name; 2) short description; 3) long description; 4) type (may be only of primitive types or of types defined in the model); and 5) value(s). Parameter value(s) exist only at run time. During modeling, there may need to be a specification of whether the parameter can hold single or multiple values.

In regard to physical representation, at design time, actions are represented in: 1) relational tables that contain the action definition; and 2) rules, in form of their usage and source code. In rules, actions may be represented in the rule body with the following grammar:

```
rule_body      →    THEN
                    <LEFT_BRACE>
                    rule_actions
                    <RIGHT_BRACE>
rule_actions   →    rule_action
                    [
                        (
                        <SEMICOLON>
                        rule_action
                        )+
                    ]
rule_action    →    action_name
                    <LPAREN>
                    arguments
                    <RPAREN>
arguments      →    argument
                    (
                    <COMMA>
                    argument
                    )*
argument       →    (
                    rule_alias( )
                    |
                    literal( )
                    ).
```

At run time, actions may be implemented by a PFUNCTION exit in the SCE. Similar functions may be used in other rule engines, although in Jrules, for example, actions may be implemented through direct calls to the Java code created in the core directory.

There are two primary design choices for implementing actions in the SCE environment: 1) all actions are represented by one PFUNCTION; or 2) each set of actions is translated into one single PFUNCTION. Alternatively, a stringified/object representation of the actions could be built up in the SCE. An object representation of the same, however, would probably have a lot of work-arounds, due to the limited procedural support in the SCE. Another possibility is to generate a stringified representation of the action at run time in the rule body of the SCE. Table 1 illustrates the advantage and trade-offs of each approach.

TABLE 1

| Approach | Advantages | Trade-Offs |
| --- | --- | --- |
| Actions generated as object(s) in SCE | No additional storage needed<br>Rule body of SCE performs operations | Since actions are always generated, the number of objects in the SCE can become quite large, which is unnecessary, as the SCE does not pattern match on them<br>Need heavy procedural support from the SCE |
| Actions generated as a string in the SCE | No additional storage needed<br>Rule body of SCE performs operations | Difficult maintenance at the administration level<br>Generation of the rule is increased in complexity, consistency checks increase<br>Less flexible<br>Again, as actions are never used later by the SCE, this would be an additional modeling overhead in the SCE<br>Need unlimited string length support from the SCE |
| One Action maps to one PFUNCTION | Unique mapping approach<br>Everything may be performed by code<br>No additional tables need distribution, only code needs distribution<br>Possibly faster than the next approach | Complex generation approach for the rule body<br>Implies that the PFUNCTION needs to be coded in a Java file for each action set, or generated; implies a compilation in Java phase before deployment<br>Complex deployment issues |
| All Actions map to one PFUNCTION | Simple generation approach<br>Only one PFUNCTION needed; implies that any action set can be built up via lookups at run time<br>No complicated deployment issues | Needs RDBMS storage; implies table distribution issues<br>Additional consistency checks for the tables for deployment<br>Complex PFUNCTION code implementation<br>Need binding table exposure from the SCE |

Note that for the last approach in the table, additional storage is needed. This will be discussed below in regards to storage.

Deployment choices for each of the four approaches outlined above are different. The deployment has two parts: 1) translation to the SCE Rule Body; and 2) storage of any additional information. Table 2 outlines what may be required in each of the scenarios.

TABLE 2

| Approach | Translation | Storage |
| --- | --- | --- |
| Actions generated as object(s) in SCE | A Pre-requisite for this is procedural support from the SCE; this approach may not have with a clean solution | — |
| Actions generated as a string in the SCE | Need a standard representation of actions as a string<br>Need unlimited string length support from the SCE<br>A session object in the SCE has a multi-valued cstic (e.g., object attribute) called Actions; values are added to it all the time in the body<br>Additional external queuing is necessary to delta from all actions the last set of actions created<br>Need a stringified representation of the types that can be passed in as parameters and the same are accessible from within the Rule Body (Support may not be there currently for ADTs or numeric cstics and so on) | None required; all items taken care of by the SCE |
| One action maps to one PFUNCTION | The SCE needs to support parameter passing<br>Create a new PFUNCTION<br>Map the parameters required<br>Map each parameter correctly during rule body translation<br>Generate the code for building the list of actions | Only code storage |
| All actions map to one PFUNCTION | Generate the PFUNCTION with simplest parameters | Store the list of actions and their parameters in a deployment table set, to be picked up when the PFUNCTION executes |

With regard to storage, at design time, part of the actions may be stored as part of the rule source code. During deployment, these may be added to the following tables:

```
CREATE TABLE [RuleAction]
(
/*
Represents the Object ID
*/
[OID] binary(16) NOT NULL,
/*
Represents the Object Type
*/
[Type] varchar(100) NOT NULL,
/*
Represents the Parent ID, in this case, the Ruleset ID
*/
[PID] binary(16) NOT NULL,
```

```
/*
Represents the Parent Type, in this case, the Ruleset Type
*/
[PType] varchar(100) NOT NULL,
/*
Flag to indicate if the Rule is deleted or not.
*/
[IsDeleted] char(1) NOT NULL,
/*
The sequence number of this action relative to the rule body
*/
[SequenceNo] numeric(4,0),
/*
The Action ID for this rule
*/
[ActionID] binary(16) NOT NULL
)
ALTER TABLE [RuleAction] ADD CONSTRAINT
    PK_Rule PRIMARY KEY NONCLUSTERED
(
OID
); and
CREATE TABLE [RuleActionParameter]
(
/*
Represents the Object ID
*/
[OID] binary(16) NOT NULL,
/*
Represents the Object Type
*/
[Type] varchar(100) NOT NULL,
/*
Represents the Parent ID, in this case, the Action ID
*/
[PID] binary(16) NOT NULL,
/*
Represents the Parent Type, in this case, the Action Type
*/
[PType] varchar(100) NOT NULL,
/*
Flag to indicate if the Parameter is deleted or not.
*/
[IsDeleted] char(1) NOT NULL,
/*
The ID of the Parameter
*/
[ParameterID] binary(16) NOT NULL,
/*
The Value(s) of the Parameter relative to the Rule
*/
[ParameterValue] text
)
ALTER TABLE [RuleActionParameter] ADD CONSTRAINT
    PK_Rule PRIMARY KEY NONCLUSTERED
(
OID
).
```

Note that these tables are only representative of an implementation. Furthermore, they are designed for a Microsoft SQL server. Tables for other servers, such as, for example, Oracle, could also be implemented.

With regard to physical representation, at design time, rules are part of: 1) source code; 2) parse context; and 3) persistent storage. In the source code, rules may have the following grammar:

```
rule          →    [
                       rule_declarations
                   ]
                   rule_condition
                   rule_body
rule_declarations →   rule_declaration
                   [
                   (
                   <SEMICOLON>
                   rule_declaration
                   )+
                   ].
```

At run time, rules are represented by a RETE NET set and eval code modules within the SCE. Additionally, the PFUNCTION(s) and the deployment tables for actions are also part of the rule runtime representation. For deployment, each logical component of the rule is translated as explained above.

For storage, a business rule may be stored as source code. This may be done in a rule table, for example. This table may be important if the source code of the rule is stored in the base grammar format. The table may be attached to the Modeling Environment model rather than the SCE Model. Additionally, the same table could be overloaded to store the source code for templates. An example a rule table is as follows:

```
CREATE TABLE [Rule]
(
/*
Represents the Object ID
*/
[OID] binary(16) NOT NULL,
/*
Represents the Object Type
*/
[Type] varchar(100) NOT NULL,
/*
Represents the Parent ID, in this case, the Ruleset ID
*/
[PID] binary(16) NOT NULL,
/*
Represents the Parent Type, in this case, the Ruleset Type
*/
[PType] varchar(100) NOT NULL,
/*
Flag to indicate if the Rule is deleted or not.
*/
[IsDeleted] char(1) NOT NULL,
/*
Represents the Template ID that this Rule is based upon
*/
[TID] binary(16),
/*
Represents the Template Type that this Rule is based on
*/
[TType] varchar(100) NOT NULL,
/*
The name of the Rule
*/
[Name] varchar(100) NOT NULL,
/*
Represents the name of the corresponding SCE Rule
*/
[SCERuleName] varchar(50),
/*
Represents the source code of the Rule
*/
[Source] text
)
ALTER TABLE [Rule] ADD CONSTRAINT
    PK_Rule PRIMARY KEY NONCLUSTERED
(
OID
).
```

As mentioned previously, business rules may be combined into rulesets. With regard to physical representation, at design time, these may be represented as persistable objects. At run time, these are Rule Nets within the SCE. At deployment, a Rule Net is created for each ruleset.

Rulesets may be stored in different ways. One technique may be to use the SCE for storage, which implies that the run time Knowledge Base (KB) has to be completely separated from the design time. In another technique, the following could be used:

```
CREATE TABLE [Ruleset]
(
/*
Represents the Object ID
*/
[OID] binary(16) NOT NULL,
/*
Represents the Object Type
*/
[Type] varchar(100) NOT NULL,
/*
Represents the Parent ID, in this case, the Ruleset ID
*/
[PID] binary(16) NOT NULL,
/*
Represents the Parent Type, in this case, the Ruleset Type
*/
[PType] varchar(100) NOT NULL,
/*
Flag to indicate if the Rule is deleted or not.
*/
[IsDeleted] char(1) NOT NULL,
/*
The name of the Ruleset
*/
[Name] varchar(100) NOT NULL,
/*
The mapped SCE Rule Net
*/
[SCERuleNetName] varchar(50) NOT NULL
)
ALTER TABLE [Ruleset] ADD CONSTRAINT
    PK_Rule PRIMARY KEY NONCLUSTERED
(
OID
).
```

In either scenario, a map from the anchor to the SCE Rule Net name may be required. At the SCE/PME level, a business ruleset translates into one or more rule or constraint nets.

Turning to rule templates, a rule template may have the logical properties shown in Table 3.

Functionally, the additional properties defined for the parameters and the groups relate to viewing a rule based on a template in a Restricted Structured Editor view of the rules. The construction algorithm based on the template group concepts are described for the following views:

```
If
    The Customer is Classified
    in the Active Business Scenario where
Then
    Promote the Products
    Back.
```

The root view of the rule may be built up as follows:
1. Identify the template(s) that the rule is linked to
2. Parse the Rule to get:
    a. Template(s) the rule is based upon
    b. The Groups
    c. Parameters within the groups
    d. Conditions/Actions in which the parameters are present
    e. Groups in the Condition section
    f. Groups in the Action section
    g. Simple Expression where the parameter is located
3. Pretty print the Rule in the following way:
    a. If
    b. Iterate over the groups in the condition section
        i. Lead Object Name
        ii. Lead Object Relationship with Parameters
        iii. Group Name
    c. Then
    d. Iterate over the groups in the Actions section
        i. Action Name
        ii. Group Name.

As an example of the parameters to be filled was illustrated by FIG. 4. The conditions view of the parameters may be generated in the following way:
1. Get the group whose parameters are to be displayed
2. Iterate over the parameters in the group
    a. Get the condition(s) associated with the parameter
    b. Print LHS

TABLE 3

| Name | Type | Description |
| --- | --- | --- |
| Template Type | String | User Defined |
| Template Name | String | User Defined Name of the Template |
| Source | Text | Defines the source code for the template. This source code represents all the other properties that the template has, other than the ones enumerated above. |
| Groups | | The group names are defined within the source code of the template.<br>Additionally, a group may have:<br>1. Short Description<br>2. Long Description<br>3. Lead Object<br>4. Lead Object Relationship with Parameters |
| Parameters | | The parameters and their types are defined within the source code of the template.<br>Additionally, a parameter may have:<br>1. Short Description<br>2. Long Description<br>These are the entities that need to be filled in when a rule is to be generated from a template. | c. Print operator
d. Formulate an editbox bound to the parameter and tooltip as the parameter short description A similar algorithm may be used for the actions part.

One advantage of providing this view is to allow, in a user-friendly manner, business strategists to fill in values for rule creation while maintaining consistency. Thus, if a rule is based on a deleted template, this view would be almost like a text view. Implementation of this view does not have any appreciable runtime effect.

With regard to physical representation, at design time, the basic properties (at least the ones of interest) may be part of the source code of the template, as the template may need to be editable also in text mode. The following represents grammar pertaining to templates in the overall rule grammar:

```
group_declaration       →     <GROUP>
    group_name
group_name              →     <IDENTIFIER>
param_declaration       →     <PARAM>
    rule_type
    <AS>
    <PARAMIDENTIFIER>
    [
        <LPAREN>
        group_name
        <RPAREN>
    ]
    [
        <EQUAL>
        param_value
    ]
param_value             →     <STRING_LITERAL>
    |
    <CHARACTER_LITERAL>
    |
    <INTEGER_LITERAL>
    |
    <FLOATING_POINT_LITERAL>
    |
    <IDENTIFIER>              // For Rule Alias
    |
    <TYPEIDENTIFIER>          // For a type
```

Additionally, the expressions and action parameters need to be modified to take PARAMIDENTIFIERS as valid tokens. Parsing the text, an object model for templates is present in the parse context.

At run time, templates do not exist. At deployment, templates have no deployment effect. For storage, the basic properties of a template are the same as that of a rule; hence, the Rule Table can be overloaded to save templates as well. In case a separate table is required, the following may define the table structure:

```
CREATE TABLE [Template]
(
/*
Represents the Object ID
*/
[OID] binary(16) NOT NULL,
/*
Represents the Object Type
*/
[Type] varchar(100) NOT NULL,
/*
Represents the Parent ID, in this case, the Templateset ID
*/
[PID] binary(16) NOT NULL,
/*
Represents the Parent Type, in this case, the Templateset Type
*/
[PType] varchar(100) NOT NULL,
/*
Flag to indicate if the Template is deleted or not.
*/
[IsDeleted] char(1) NOT NULL,
/*
The name of the Template
*/
[Name] varchar(100) NOT NULL,
/*
Represents the source code of the template
*/
[Source] text
)
ALTER TABLE [Rule] ADD CONSTRAINT
    PK_Rule PRIMARY KEY NONCLUSTERED
    (
        OID
    ).
```

Additionally, if persistence is required for the additional group properties and parameter properties, the following defines tables for the same:

```
CREATE TABLE [TemplateGroup]
(
/*
Represents the Object ID
*/
[OID] binary(16) NOT NULL,
/*
Represents the Object Type
*/
[Type] varchar(100) NOT NULL,
/*
Represents the Parent ID, in this case, the Template ID
*/
[PID] binary(16) NOT NULL,
/*
Represents the Parent Type, in this case, the Template Type
*/
[PType] varchar(100) NOT NULL,
/*
Flag to indicate if the TemplateGroup is deleted or not.
*/
[IsDeleted] char(1) NOT NULL,
/*
The name of the TemplateGroup
*/
[Name] varchar(100) NOT NULL,
/*
Represents the lead object of the template
*/
[LeadObject] varchar(100),
/*
Represents the relationship of the lead object with the params    */
[LeadRelationship] varchar(100)
)
ALTER TABLE [Rule] ADD CONSTRAINT
    PK_Rule PRIMARY KEY NONCLUSTERED
    (
        OID
    ); and
CREATE TABLE [TemplateParam]
(
/*
Represents the Object ID
*/
[OID] binary(16) NOT NULL,
/*
Represents the Object Type
*/
[Type] varchar(100) NOT NULL,
/*
```

```
Represents the Parent ID, in this case, the Group ID
*/
[PID] binary(16) NOT NULL,
/*
Represents the Parent Type, in this case, the Group Type
*/
[PType] varchar(100) NOT NULL,
/*
Flag to indicate if the TemplateParam is deleted or not.
*/
[IsDeleted] char(1) NOT NULL,
/*
The name of the TemplateParam
*/
[Name] varchar(100) NOT NULL
)
ALTER TABLE [Rule] ADD CONSTRAINT
    PK_Rule PRIMARY KEY NONCLUSTERED
    (
    OID
).
```

In general, for storing any kind of short/long text, a table may be used.

As possible enhancements to the illustrated model, rules may be based off more than one template. Hence, the concept of template merging and namescoping would be an issue. This would especially be true if templates are separated into templates that have only conditions or only actions defined and a rule is based on a combination of them. This could give rise to the concept of pre-defined templates that cannot be modified. Pre-defined templates could consist of: 1) dynamic customer classification; 2) business event patterns; 3) business event sequences; and 4) active business scenario. Other areas of interest may be template specialization and template merging.

Just as rules maybe grouped into rulesets, templates maybe grouped into templatesets. A templateset exists for logical grouping of templates. A templateset, however, does not exist at run time. With regard to physical representation, at design time, templatesets may be represented as persistable objects. At run time, there may be no representation of the templatesets.

For storage, a ruleset table may be overloaded to store templatesets. Or the following table can be used:

```
CREATE TABLE [Templateset]
    (
    /*
    Represents the Object ID
    */
    [OID] binary(16) NOT NULL,
    /*
    Represents the Object Type
    */
    [Type] varchar(100) NOT NULL,
    /*
    Represents the Parent ID, in this case, the Anchor ID
    */
    [PID] binary(16) NOT NULL,
    /*
    Represents the Parent Type, in this case, the Anchor Type
    */
    [PType] varchar(100) NOT NULL,
    /*
    Flag to indicate if the Templateset is deleted or not.
    */
    [IsDeleted] char(1) NOT NULL,
    /*
    The name of the Templateset
    */
    [Name] varchar(100) NOT NULL
    )
ALTER TABLE [Templateset] ADD CONSTRAINT
    PK_Rule PRIMARY KEY NONCLUSTERED
    (
    OID
    ).
```

The editing of a rule may be enhanced by allowing the use of a flexible lexicon to the user. For example, consider the rule syntax presented above. The parser requires that the lexical state of the code typed in be disambiguated as the source is scanned from left to right. During this process, the code is Tokenized and presented to the parser. Pre-defined tokens form the "Keyword" set of the rule. This "Keyword" set may be made flexible, and the user may have an option to choose his/her own lexicon to represent a rule. In this situation, however, the grammar, or structure of the rule, does not have to change.

Rules are stored as text. They are parsed into a parse context to get any interpretation accomplished, be it by a structured editor, a restricted structured editor, or otherwise, or for any translation purposes. A rule is typically stored in the base grammar/base lexicon format. The situations where translations may be required are: 1) loading the rule in the context of a lexicon other than the base lexicon; 2) editing the rule in the context of a lexicon other than the base lexicon; 3) saving the rule in the context of a lexicon other than the base lexicon; and 4) transforming a rule from one lexicon to another.

To parse rule source code with the grammatical structure as constant, but with a different lexicon set, requires a different lexer. In the case of a JavaCC implementation, a separate parser itself may be required. Hence, in the context of a different lexicon, a different parser may be required.

In the generic sense, a recursive, back-tracking parser/lexer can be built to generically parse all source code based on the same grammatical structure, but on a different lexicon. However, such a parser may suffer in performance due its inherent backtracking approaches.

Thus, a parser may be chosen based on the combination of a lexicon and a grammar, implying a structure that has: 1) lexicon ID; 2) grammar ID; 3) class name of the parser; and 4) root method name to start rule parsing. The base grammar may be pre-defined "Master" grammar for Rules. The base lexicon may be pre-defined "Master" lexicon for Rules. The lexicon may consist of the "Keywords" in Table 4. The literals and identifier definitions should remain the same. Note that source code in one grammar/lexicon need not compile in the other, as long as the source code compiles in the base grammar.

TABLE 4

| Category | Keyword | Description |
| --- | --- | --- |
| COMPARISION OPERATOR | EQUAL | The equality operator |
| COMPARISION OPERATOR | GT | Greater Than |
| COMPARISION OPERATOR | LT | Less Than |

TABLE 4-continued

| Category | Keyword | Description |
|---|---|---|
| COMPARISION OPERATOR | LE | Less Than or Equal To |
| COMPARISION OPERATOR | GE | Greater Than or Equal To |
| BOOLEAN OPERATOR | AND | And |
| BOOLEAN OPERATOR | OR | Or |
| BOOLEAN OPERATOR | NOT | Not |
| ARITHMETIC OPERATOR | PLUS | + |
| ARITHMETIC OPERATOR | MINUS | − |
| ARITHMETIC OPERATOR | STAR | * |
| ARITHMETIC OPERATOR | FSLASH | / |
| ARITHMETIC OPERATOR | EXP | ** |
| LOGICAL BLOCK | LPAREN | ( |
| LOGICAL BLOCK | RPAREN | ) |
| LOGICAL BLOCK | LBRACE | { |
| LOGICAL BLOCK | RBRACE | } |
| LOGICAL BLOCK | LBRACKET | [ |
| LOGICAL BLOCK | RBRACKET | ] |
| SEPARATOR | SEMICOLON | ; |
| SEPARATOR | COMMA | , |
| TYPESEPARATOR | DOT | . |
| PARAMPREFIX | QUESTION | ? |
| BEGIN CONDITION | IF | If |
| END CONDITION | ENDIF | End If |
| DECLARATOR | PARAM | Parameter Declarator |
| DECLARATOR | GROUP | Group Declarator |
| DECLARATOR | ALIAS | Alias Declarator |
| BEGIN RULE BODY | THEN | Then |
| DECLARATOR SEPARATOR | AS | As |
| PARAMETER IDENTIFIER | PARAMIDENTIFIER | <QUESTION><IDENTIFIER> |
| TYPE IDENTIFIER | TYPEIDENTIFIER | <IDENTIFIER><DOT><IDENTIFIER> |

A lexicon is defined as a set of definitions for the above-defined base lexicon. Also, certain configurations of a lexicon may not be valid. A configuration KB may be written to determine this.

A lexicon may not be valid if the grammar generated by it in the JavaCC format generates Java code with more than one warning. (The one warning is with regard to Unicode characters). Thus, the rule presented earlier:

```
IF
(Customer.CustomerType = „GOLD" and
ShoppingBasket.ProductCategory = „HITECH")
Then
{
Promote(„HANDHELD");
},
``` could look like:

```
BEGIN CONDITION
Customer has the attribute CustomerType
equal to „GOLD" as well as
ShoppingBasket has the attribute Product
has the attribute Product Category equal to
„HITECH"
END CONDTION
BEGIN RULE BODY
Promote „HANDHELD."
```

With regard to physical representation, at design time, a lexicon set is a set of persistable objects representing the storage. A lexicon may also be represented in a grammar. To create a grammar based off this lexicon, the parsing architecture should be flexible/configurable and based off an interface. In the case of JavaCC, the following steps should be taken:

1. Generate the JavaCC Grammar from the base grammar, the base lexicon, and the current Lexicon;
2. Transform the JavaCC grammar by running JavaCC;
3. If JavaCC has more than one warning, report an error in the lexicon;
4. Else;
5. Compile the Java code generated;
6. Make the necessary table entry. (The parser name can be generated).

At run time, there is no representation of a separate lexicon. At deployment, there should not be any representation of separate lexicon as all transformations are done before the rule source is stored. An alternative is to store the Parser ID with the Rule. (This can be taken up at a later stage.)

For storage, tables may be used. The following tables may be used to implement this functionality:

```
CREATE TABLE [Lexicon]
(
/*
Represents the Object ID
*/
[OID] binary(16) NOT NULL,
/*
Represents the Object Type
*/
[Type] varchar(100) NOT NULL,
/*
Represents the Parent ID
*/
[PID] binary(16) NOT NULL,
/*
Represents the Parent Type
*/
[PType] varchar(100) NOT NULL,
/*
Flag to indicate if the Lexicon is deleted or not.
*/
[IsDeleted] char(1) NOT NULL,
```

```
/*
The name of the Lexicon
*/
[Name] varchar(100) NOT NULL
)
ALTER TABLE [Lexicon] ADD CONSTRAINT
    PK_Rule PRIMARY KEY NONCLUSTERED
(
OID
);
CREATE TABLE [Grammar]
(
/*
Represents the Object ID
*/
[OID] binary(16) NOT NULL,
/*
Represents the Object Type
*/
[Type] varchar(100) NOT NULL,
/*
Represents the Parent ID
*/
[PID] binary(16) NOT NULL,
/*
Represents the Parent Type
*/
[PType] varchar(100) NOT NULL,
/*
Flag to indicate if the Grammar is deleted or not.
*/
[IsDeleted] char(1) NOT NULL,
/*
The name of the Grammar
*/
[Name] varchar(100) NOT NULL
)
ALTER TABLE [Grammar] ADD CONSTRAINT
    PK_Rule PRIMARY KEY NONCLUSTERED
(
OID
);
CREATE TABLE [LexiconDetail]
(
/*
Represents the Object ID
*/
[OID] binary(16) NOT NULL,
/*
Represents the Object Type
*/
[Type] varchar(100) NOT NULL,
/*
Represents the Parent ID, the Lexicon
*/
[PID] binary(16) NOT NULL,
/*
Represents the Parent Type
*/
[PType] varchar(100) NOT NULL,
/*
Flag to indicate if the Lexicon is deleted or not.
*/
[IsDeleted] char(1) NOT NULL,
/*
The ID of the Lexicon Element
*/
[LexElementID] binary(16) NOT NULL,
/*
The Translation of the Lexicon Element
*/
[Translation] varchar(100) NOT NULL
)
ALTER TABLE [LexiconDetail] ADD CONSTRAINT
    PK_Rule PRIMARY KEY NONCLUSTERED
(
OID
); and
CREATE TABLE [LexGrammarParser]
(
/*
Represents the Object ID
*/
[OID] binary(16) NOT NULL,
/*
Represents the Object Type
*/
[Type] varchar(100) NOT NULL,
/*
Represents the Parent ID
*/
[PID] binary(16) NOT NULL,
/*
Represents the Parent Type
*/
[PType] varchar(100) NOT NULL,
/*
Flag to indicate if the element is deleted or not
*/
[IsDeleted] char(1) NOT NULL,
/*
The ID of the Lexicon
*/
[LexID] binary(16) NOT NULL,
/*
The ID of the Grammar
*/
[GrID] binary(16) NOT NULL,
/*
The class name of the parser
*/
[ParserClass] varchar(255) NOT NULL,
/*
The method for the root in the parser
*/
[ParseMethod] varchar(255) NOT NULL
)
ALTER TABLE [LexGrammarParser] ADD CONSTRAINT
    PK_Rule PRIMARY KEY NONCLUSTERED
(
OID
).
```

These tables require initial data for the base lexicon, grammars, and parser.

Note that all potential functions have not been discussed for the implementation. For example, the discussion did not mention support for string functions, mathematical functions, and Boolean functions in expressions. But these may be implemented. Other functions include the deployment story; flexible grammar; generation of grammars; template editing in a fully structured way; short text and long texts concepts; pretty printing based on lexicon and grammar; hyper-help generation based on lexicon and grammar; UI for defining templates, templatesets, rulesets, and lexicon; consistency checks and criterion for defining a correct lexicon set; generic parser for all lexicon sets; and supporting functions in the grammar and in personalization conditions. These may be implemented, however, in view of the discussed implementation.

The rules should be stored in a way so that they can be retrieved and analyzed. For the currently described implementation, a metamodel is used for the rule repository. The following describes the architecture for a metamodel for the rule repository. The following also pertains to the architecture of parsing, pretty printing, and translation of the rules in the rule repository to SCE and Jrules. In doing so, it details the classes, interfaces, and usage of the services. It also describes the support for the UI for editing the rule entities as text for styling the UI Text and hyper-help/Intellisense in the UI.

The metamodel includes the rule repository meta-data that is required for rules and their related objects. It has the following components: object repository, classification repository, and rule repository.

FIGS. 7A-B illustrate a metamodel object repository 700 for data conveyance management. In general, FIG. 7A depicts the basic hierarchy of the object classification at the interface level, and FIG. 7B depicts the relationship between the basic entities.

As illustrated, object repository 700 includes a model entity 704, which is the base class in the model. Subclasses of model entity 704 include action 708, parameter 712, method 716, attribute 720, parsable entity 724, classification entity 728, parsable entity set 732, classifier 736, and data type 740. Subclasses of classifier 736 include event 744 and OOClass 748.

Thus, the basic metamodel structure consists of model entities. Each element in the metamodel is a model entity with the exception of text, which is an independent, language-based, translatable free text to be used for descriptions.

Note that the underlying rule engine does not matter to object repository 700, as adapters may be used for different rule engines. In general, an adapter is an implementation for a specific rule engine. The adapter takes care to provide the client of itself with the same interface and takes care of the differences of the underlying rule engines.

The classification repository structures consist of the model entities that are used to segregate the basic model entities and the rule model entities. They introduce the name-scoping of entities where applicable. The entities in this repository may be designed to fit into the structure of a typical business application.

FIG. 8 illustrates a classification entity relationship 800. In particular, a classification entity 810 includes an application 820, an application anchor 830, an application area 840, and a business process 850. Thus, relationship 800 illustrates the hierarchy for the classification entity.

With regard to relationships between the classification entities, the root entity for the classification is the application. An application is divided into a number of application areas. In turn, an application area has various business processes within it. A business process has a number of application anchors, which define the points at which personalization needs to occur in the application.

An advantage of using classification entities is to logically segregate the other entities in the system. FIG. 9 illustrates a logical segregation 900 in conjunction with the other entities. Thus, application 820 aggregates by value a set of classifiers 736 that map the application to a Java Application. These may be of the type OOClass 748 or event 744. The other classification entities such as application area 830, business process 840, and application anchor 850 store references to classifiers 736 that exist within application 820. A classifier in a parent entity may be present in one and only one of the child entities. Only an application anchor 850 may have actions associated with it. The basic assumption is that an anchor is the point of invocation for personalization at run time, and this is what would trigger actions. These actions need to be present at the anchor point and, hence, defined here. Group entities that contain all the rule entities are aggregated at the application level.

The rule repository consists of two kinds of entities: 1) parsable entity sets; and 2) parsable entities. Parsable entity sets group together a set of parsable entities under them. This may be a logical grouping with or without semantic implications. Parsable entity sets also act as namescoping entities. A parsable entity is the base for rules in rule-based personalization. Parsable entity types include rule, template, named condition, and named action.

FIG. 10 illustrates a parsing relationship 1000 for data conveyance management. As illustrated, a parsable entity set 1010 could be a rule set 1020, a template set 1030, a named action set 1040, or a named condition set 1050. Furthermore, template set 1030 could be a rule template set 1060, a named condition template set 1070, or a named action template set 1080.

FIG. 11 illustrates a parsing relationship 1100 for data conveyance management. As illustrated, a parsable entity 1110 could be a named action 1120, a template 1130, a named condition 1140, or a rule 1150. Additionally, template 1130 could be a rule template 1160, a named condition template 1170, or a named action template 1180. Note that rule template 1160, named condition template 1170, and named action template 1180 should not refer to each other.

A rule is ultimately what is translated and deployed to a rule engine. Logically, a rule is written to make use of the basic model entities that have been defined in the classification entities to which its parent, a ruleset, is linked. A rule may hold only weak references to all the entities to which it is linked, with the exception of its parent, the ruleset. This weak reference may be in the form of the source code of the rule. In the scenario of any failure of referential integrity, a rule will not compile and, hence, cannot be deployed or translated.

In a basic sense, a rule is source code that describes what to do and when to do it. To define the same, a rule consists of the following logical sections: 1) declaration; 2) condition; and 3) action. Each of the concepts maps to a syntax described later in the grammar specification section.

The declaration section of a rule defines what is to be used in a rule. This section may be defined explicitly or implicitly, from the condition that is written in the rule. This section defines the symbol table and the tables linking to the basic model entities for the rule. A declaration may have the following elements: 1) alias; 2) group; 3) parameter; and 4) import/use.

Aliases may be of two types—explicit and implicit. Akin to declaring a variable for a type, an alias declaration is an explicit declaration of a variable of that type. All sub-types of a super type that is declared as an alias may need to be explicitly declared due to the nature of pattern matching, especially if there is no support for "running dot" notation. An implicit declaration occurs when a type identifier is used directly within a rule. Due to the nature of pattern matching, an explicit alias should define a separate object instance from an implicit alias.

A parameter is defined as a placeholder for a type that needs specification. For a rule, the value for the parameter needs to be specified. For templates, this value may be empty. A parameter has a type that is linked to a: 1) model entity; 2) named condition; or 3) named action. It is also linked to a group that is defined within the same rule. This linking is to be used in creation/editing of a rule using text associated with a template.

A group defines a logical grouping of parameters for the rule. The usage of this is reflected in defining texts for templates.

With regard to import/use, due to the nature of namescoping, to use directly the names of action(s), named condition(s), and named action(s), this mechanism allows the user to easily reference the entity required. This is similar to a Java import.

The condition section of a rule defines the situations under which the rule is to be fired. A condition may be: 1) a named condition; or 2) an explicit condition. An explicit condition is, for example, a Boolean expression. Particular implementations may allow for the usage of only objects and attributes in a condition expression. A named condition is an abstraction of the condition section of a rule. It may include a declaration section and an expression section. The declaration section defines what is to be used in the named condition, and the elements of the named condition are the same as that of the declaration section of the rule. The expression section defines the Boolean expression of the condition.

The action section of a rule defines what needs to be done in the event that the condition of the rule is matched. This defines an ordered sequence of: 1) actions defined in an application anchor; and 2) named actions.

A named action is an abstraction of the actions section of the rule. It includes a declaration section and an action section. The declaration section includes a group and a parameter, with the definition of the groups and parameters remaining the same as in a rule. A parameter cannot be of the type named condition or named action in this case. The action section defines a sequence of action(s).

A template may be of the following types: 1) rule template; 2) named condition template; or 3) named action template. Each template has two parts: 1) base parsable source; and 2) template text.

The base parsable source of a template is similar to the corresponding type of parsable entity it defines. The base parsable source of the template, however, does not need to define the parameter value for the parameter in the source code for the template and may be attached to a descriptional, language dependent, natural language text that can be used to define rules out of the defined template. The differentiation is in the semantic checking of the parsable entity.

Template text is a special, natural-language-dependent text that is attached to the base parsable source of a template. It defines plain text that can be shown to the user in lieu of the source code so that the user can enter parameter values in an easier fashion. Template text may have group text and parameter text. Group text is a part of the free text that the developer writes and that is to be displayed as a hyper-link to the parameter set of the group. Parameter text is to be shown to the user for entering a parameter value. The groups and parameters in this text set have to adhere to the group and parameter set that are actually defined by the template.

Relationships exist between the parsable entities and other entities. Parsable entity sets group together the parsable entities. Each parsable entity set is linked to zero or more classification entities. Semantically, this implies that a parsable entity within a parsable entity set is able to make use of only those basic entities that are defined under the classification entities that the parsable entity set, its parent, is attached to.

FIG. 12 illustrates a relationship 1200 between rule entities. Details on the concepts of each individual entity have been discussed previously.

The actual grammar used for rules may have a variety of formats. A format that uses Backus Naur Form (BNF) notation and that describes the syntax is:

```
/*
* Comment specification
*/
rule                    [rule_declarations]
                        rule_condition
                        rule_body
rule_declarations    ⇒  (rule_declaration
                        SEMICOLON)+
rule_declaration     ⇒  alias_declaration
                        | param_declaration
                        | group_declaration
                        | import_declaration
```

-continued

```
import_declaration   ⇒  IMPORT
                        (
                            type_identifier
                            [
                            DOT
                            STAR
                            ]
                        )
param_declaration    ⇒  PARAM
                        rule_type
                        AS
                        PARAMIDENTIFIER
                        LPAREN
                        group_name
                        RPAREN
                        [
                            param_value
                        ]
group_declaration    ⇒  GROUP
                        group_name
group_name           ⇒  IDENTIFIER
param_value          ⇒  STRING_LITERAL
                        | CHARACTER_LITERAL
                        | INTEGER_LITERAL
                        | FLOATING_POINT_LITERAL
                        | ALIASIDENTIFIER
                        | type_identifier
type_identifier      ⇒  IDENTIFIER
                        (
                        DOT
                        IDENTIFIER
                        )*
alias_declaration    ⇒  ALIAS
                        type_identifier
                        AS
                        rule_alias
                        [
                        WHERE
                        sub_alias_declaration
                        (
                            COMMA
                            sub_alias_declaration
                        )+
                        ]
sub_alias_declaration ⇒ IDENTIFIER
                        AS
                        ALIASIDENTIFIER
rule_type            ⇒  type_identifier
                        | CONDITION
                        | ACTION
alias_type           ⇒  ALIASIDENTIFIER
rule_condition       ⇒  IF
                        expression
expression           ⇒  NOT
                        LPAREN
                        boolean_expression
                        RPAREN
boolean_expression   ⇒  boolean_and_expression
                        (OR
                        boolean_and_expression)*
boolean_and_expression ⇒ equality_expression
                        (AND
                            equality_expression)*
equality_expression  ⇒  relational_expression
                        (
                        (
                            EQUAL
                        |
                            NE
                        |
                            GT
                        |
                            GE
                        |
                            LE
                        |
                            LT
                        )
                        relational_expression)*
```

```
relational_expression      ⇒  multiplicative_expression
                              (
                                (
                                  PLUS
                                  |
                                  MINUS
                                )
                                multiplicative_expression
                              )*
multiplicative_expression  ⇒  unary_expression
                              (
                                (
                                  STAR
                                  |
                                  FSLASH
                                )
                                unary_expression
                              )*
unary_expression           ⇒  (
                                PLUS
                                |
                                MINUS
                              )
                              unary_expression
                              |
                              exponent_expression
exponent_expression        ⇒  primary_expression
                              (
                                (
                                  EXP
                                  primary_expression
                                )
                              )*
primary_expression         ⇒  LPAREN
                              expression
                              RPAREN
                              |
                              literal
                              |
                              rule_variable
                              |
                              rule_named_condition
rule_named_condition       ⇒  LBRACKET
                              IDENTIFIER
                              RBRACKET
rule_variable              ⇒  type_identifier
                              |
                              rule_alias
                              |
                              PARAMIDENTIFIER
literal                    ⇒  STRING_LITERAL
                              |
                              CHARACTER_LITERAL
                              |
                              INTEGER_LITERAL
                              |
                              FLOATING_POINT_LITERAL
                              |
                              TRUE
                              |
                              FALSE
rule_body                  ⇒  THEN
                              LBRACE
                              rule_actions
                              RBRACE
rule_actions               ⇒  (
                                rule_action
                                SEMICOLON
                              )*
rule_action                ⇒  action_name
                              LPAREN
                              [
                                arguments
                              ]
                              RPAREN
action_name                ⇒  argument
                              (
                                COMMA
                                argument
                              )*
argument                   ⇒  rule_alias
                              |
                              literal
                              |
                              PARAMIDENTIFIER.
```

An example of the grammar for a named condition is:

```
named_condition                    [
                                     named_condition_declarations
                                   ]
                                   expression
named_condition_declarations    ⇒  rule_declarations.
```

An example of the grammar for a named action is:

```
named_action                       [
                                     named_action_declarations
                                   ]
                                   rule_actions
named_action_declarations       ⇒  rule_declarations.
```

An example of the grammar for template text is:

```
template_text                      PCDATA
                                   |
                                   (
                                     STARTTAG
                                     parameter_text
                                     |
                                     group_text
                                   )*
parameter_text                 ⇒   PARAMIDENTIFIER
                                   EQUAL
                                   PTAGPCDATA
                                   PGT
group_text                     ⇒   GIDENTIFIER
                                   EQUAL
                                   GTAGPCDATA
                                   GGT.
```

This grammar describes the link for natural language text to a rule. That is, it provides a machine to natural language bridge.

Semantic checks may be performed on rules, named conditions, named actions, rule templates, named condition templates, and named action templates.

For rules, the symbols may be cross checked. To accomplish this, the declarations may be checked to make sure that there are no duplicate symbols, and the parameters may be checked to make sure that each belongs to a group that is defined and that the parameter value is specified. Additionally, the conditions may be checked to make sure that the aliases are defined, the parameters are specified, and the implicit aliases are defined, an internal verification. Furthermore, the actions may be checked to make sure that the aliases are defined, the parameters are specified, and the implicit aliases are defined, an internal verification. As other examples of checking rules, symbols may be linked to the model, and a type check may be performed.

For named conditions, the symbols may be cross checked. To accomplish this, the declarations may be checked to ensure that there are no duplicate symbols, and the parameters may be checked to ensure that each belongs to a group that is defined, each parameter value is specified, and the parameter type is not "Condition" or "Action." Furthermore, the conditions may be checked to ensure that the aliases are specified, the parameters used are specified, the implicit aliases are defined, an internal verification, and there are no nested named conditions. As other examples of checking named conditions, symbols may be linked to the model, and a type check may be performed.

For named actions, the symbols may be cross checked. To accomplish this, the declarations may be checked to ensure that there are no duplicate symbols, that the aliases are defined, that the parameters belong to groups that are defined, that the parameter values are specified, and that the parameter type is not "Condition" or "Action." The actions may be checked to ensure that the parameters used are specified and that no nested named actions exist. As other examples of checking named actions, symbols may be linked to the model, and a type check may be performed.

For rule templates, the checks for rules apply, except that the parameters do not have to be specified.

For named condition templates, the checks for the named conditions apply, except that the parameters do not have to be specified.

For named action templates, the checks for the named action apply, except that the parameters do not have to be specified.

In other implementations, the parsable entity and/or parsable entity set may be moved to the application level. Moreover, classes may be moved to the application level. Additionally, parsable entities may be attached to multiple anchors. In certain implementations, parameter types may be conditions or actions. Furthermore, named condition templates and named action templates may be added, and named actions may be added. Moreover, aliases may be added to the named condition.

Even in these implementations, however, certain limitations may be imposed. For example, named conditions and/or named actions may not be nested. As another example, aliases of named conditions in rules, excepting for the implicit alias, may not be accessed.

Techniques for translating a rule from the rule repository into a rule engine format will now be discussed in the context of the SCE rule engine. Thus, one purpose of these examples is to outline the design choices available for representing actions at translation and run time. The process of deployment and translation will be affected by the choices made. Similar techniques could be used for other rule engines such as Jrules or Jess.

To begin, the discussed translation techniques are based on several assumptions. First, an action is assumed to have the following structure:

| Name | Description |
| --- | --- |
| NAME | Name of the Action, single-valued, String characteristic |
| PARAMETERS | Parameters for this action, a multi-valued characteristic of the type: ACTIONPARAMETER |
| Name | Description |
| NAME | Name of the Parameter, single-valued, String characteristic |
| VALUE | Value of the Parameter, has to be of the TYPE: SCE_ANY, assuming that the basic data types are also sub-types of SCE_ANY. |

Second, relationships between objects are modeled as Abstract Data Type (ADT) characteristics between objects. Note that there are other means of modeling, which could affect the translation process.

The translation process will now be illustrated by considering the following rule:

```
If(Customer.targetGroup in ['GOLD', 'PLATINUM'] and
Product.Category = 'HITECH' and
ShoppingBasket.Products = Product and
ShoppingBasket.TotalPrice > 10000)
Then
{
ShowCoupon(Customer.targetGroup, System.today);
RunPromotion(ShoppingBasket, 'HITECH');
}.
```

This rule may be translated into the SCE format, and the following discussion illustrates the effects of using possible alternative techniques.

One alternative would be to use a FIND_OR_CREATE technique. This could create the relevant actions and parameters in the SCE context for the rules to return values to the application for processing. Thus, it is a translation and implementation technique.

An example of instructions for executing a FIND_OR_CREATE technique is:

```
OBJECTS:
?cust is_a (300) Customer
where
?targetGroup = targetGroup,
?prod is_a (300) Product
where
?Category = Category,
?sh is_a(300) ShoppingBasket
where
?Products = Products;
?TotalPrice = TotalPrice,
?sess is_a (300) Session
where
?actions = Actions,
?System is_a (300) System
where
?today = today.
CONDITIONS:
?targetGroup in [ 'GOLD', 'PLATINUM']
and ?Category = 'HITECH' and
?Products = ?prod and ?TotalPrice > 10000
BODY:
THEN DO:
?action1 = find_or_create ( action with
            Name = 'ShowCoupon'),
?actpar1 = find_or_create (actparam with
            Name = 'CUSTTARGETGROUP',
            Value = ?targetGroup ),
?actpar2 = find_or_create (actparam with
            Name = 'TODAY',
            Value = ?today ),
?action1.actionpars = ?actpar1,
?action1.actionpars = ?actpar2,
?action2 = find_or_create ( action with
            Name = 'RunPromotion'),
?actpar3 = find_or_create (actparam with
            Name = 'SHOPPINGBASKET',
            Value = ?sh ),
?actpar4 = find_or_create (actparam with
            Name = 'CATEGORY',
            Value = 'HITECH' ),
```

```
?action2.actionpars = ?actpar3,
?action2.actionpars = ?actpar4,
?session.actions = ?action1,
?session.actions = ?action2.
```

Of course, this assumes that support for auxiliary variables exists and that the procedural evaluation works in the correct order.

Implementing this technique has several overhead considerations. For example, at run time, the characteristic events for the session object may need to be hooked up with. Also, special modeling may be needed for action objects. Furthermore, additional objects that have nothing to do with the pattern matching may need to be created in the SCE. Thus, there may need to be a concept for removing these objects after their real-world counterparts are created. For translation, a lengthier, more-time-consuming algorithm is probably required. Also, the process will probably be hard-wired.

Using this approach may provide any of several potential advantages. For example, it may produce closed generation within the SCE. Additionally, no additional code/table maintenance may have to be provided.

This approach may have some trade-offs, however. For example, the performance may be less than that for PFUNCTIONS, to be discussed below. For instance, the implementation of a procedural routine in an interpreted language may be as much as fifty times slower than if done with native language. As another example, additional objects not used for pattern matching may be created, and thus, a retraction concept may be required. Additionally, the debugging implementation depends on SCE.

A similar technique would be to use HAS_PART. This technique is identical to the FIND_OR_CREATE technique, except that the modeling assumptions for the model are to be changed. The actions are modeled as parts of a session object and so on.

If all that needs to be generated by the actions is hard-coded strings, then the entire approach may change. However, the SCE would need to support string generation of potentially infinite length and stringification of all types of values. In that case, actions are hard-coded in the rules.

Another way in which to implement the translation is by using a PFUNCTION technique. A PFUNCTION technique may use a global PFUNCTION, for instance. An example of this is:

```
OBJECTS:
?cust is_a (300) Customer
where
?targetGroup = targetGroup,
?prod is_a (300) Product
where
?Category = Category,
?sh is_a(300) ShoppingBasket
where
?Products = Products;
?TotalPrice = TotalPrice,
?sess is_a (300) Session
where
?actions = Actions,
?System is_a (300) System
where
?today = today.
CONDITIONS:
?targetGroup in [ 'GOLD', 'PLATINUM' ]
and ?Category = 'HITECH' and
```

```
?Products = ?prod and ?TotalPrice > 10000
BODY:
THEN DO:
PFUNCTION ACTION_GENERATOR ('Rule1').
```

The algorithm for generating the action list within the PFUNCTION may be as follows:

```
Get the List of Actions defined for 'Rule1'
    (Should return 'ShowCoupon' and 'RunPromotion' )
For Each Action in the List Do
Action = createActionObject( );
Get the parameters for the action
( For ShowCoupon returns
'CUSTTARGETGROUP' and 'TODAY' )
( For RunPromotion returns
'SHOPPINGBASKET' and 'CATEGORY' )
    For Each parameter do
    Get the value that the parameter is to be bound to
    ( For CUSTTARGETGROUP returns
    '?targetGroup' )
    ( For TODAY returns '?today' )
    ( For SHOPPINGBASKET returns '?sh' )
    ( For CATEGORY returns 'HITECH' )
    If the value is hard-coded,
    action.addParameterValue(Name, Value)
    If the value is a bound parameter, get
    the parameter value from the SCE and add
    it
    ( For objects, such as the shopping
    basket, resolve to the actual shopping basket
    reference )
    End For
Session.addAction(action);
End For.
```

Of course, this assumes that the SCE supports getting at the eval-binding_table and access to the bound information using the parameter names.

This technique may entail several process overhead considerations. For example, this scheme may require additional storage for the actions and their parameters. Also, the storage needs to be filled in during deployment.

Using this approach may provide any of several potential advantages. For example, it may provide a relatively clean solution. As another example, there may be a natural extension to the debugging process. Furthermore, there may be no code maintenance or generation and, thus, no deployment compilations. Moreover, there may be a natural extension to implementing Boolean methods in conditions.

The approach does have trade-offs, however. For example, providing additional storage maintenance, which may impact performance if not cached. Also, this approach has entries on a per-rule basis. Furthermore, numeric expression evaluation may be needed, which could prove to be an advantage too.

Another type of PFUNCTION technique would to have a PFUNCTION per action. An example of this is:

```
OBJECTS:
?cust is_a (300) Customer
where
?targetGroup = targetGroup,
?prod is_a (300) Product
where
?Category = Category,
?sh is_a(300) ShoppingBasket
```

```
where
?Products = Products;
?TotalPrice = TotalPrice,
    ?sess is_a (300) Session
    where
    ?actions = Actions,
    ?System is_a (300) System
    where
    ?today = today.
CONDITIONS:
    ?targetGroup in [ 'GOLD', 'PLATINUM']
    and ?Category = 'HITECH' and ?Products
    = ?prod and ?TotalPrice > 10000
    BODY:
    THEN DO:
    PFUNCTION SHOWCOUPON (?targetGroup, ?today),
    PFUNCTION RUNPROMOTION (?sh, ,'HITECH').
```

Of course, this assumes that SCE can pass in ADTs as part of the PFUNCTION arguments and that SCE can call the PFUNCTIONS in a procedural order.

As far as overhead considerations for the technique, the deployment process will entail generating Java source code for each Action, with namescoping in place. Also, the deployment process will compile the Java code and put the class files in the classpath of the deployed system.

Using this approach may provide any of several potential advantages. For example, it may provide a relatively clean solution, which should be faster than the single function approach. Furthermore, maintenance may be at the meta-level, on a per-action basis, and there are no additional deployment tables (stored as source code). Also, numeric evaluations may be part of the SCE code (looking ahead if the SCE supports it, in the rule body).

The approach may have trade-offs, however. For example, a complicated deployment scenario may be required, as the base code for generation may need to be defined, and Java code generated and compiled. Additionally, this approach may require deployment parameter storage in the system, and the debugging implementation may be dependent on the SCE.

Another PFUNCTION technique would be to have a PFUNCTION per rule. An example of this is:

```
OBJECTS:
    ?cust is_a (300) Customer
    where
    ?targetGroup = targetGroup,
    ?prod is_a (300) Product
    where
    ?Category = Category,
    ?sh is_a(300) ShoppingBasket
    where
    ?Products = Products;
    ?TotalPrice = TotalPrice,
    ?sess is_a (300) Session
    where
    ?actions = Actions,
    ?System is_a (300) System
    where
    ?today = today.
CONDITIONS:
    ?targetGroup in [ 'GOLD', 'PLATINUM'] and
    ?Category = 'HITECH' and
    ?Products = ?prod and ?TotalPrice > 10000
    BODY:
    THEN DO:
    PFUNCTION RULE1     ( ,CUSTTARGETGROUP',
                          ?targetGroup,
                          ,TODAY',
                          ?today,
                          ,SHOPPINGBASKET',
                          ?sh,
                          ,CATEGORY',
                          ,HITECH').
```

Of course, this assumes that SCE can pass in ADTs as part of the PFUNCTION arguments.

As far as overhead for the technique, the deployment process needs to generate Java source code for each rule, with namescoping in place, compile the Java code, and put the class files in the classpath of the deployed system. Furthermore, the runtime needs to be adapted.

Using this approach may provide any of several potential advantages. For example, no additional tables may be required, and the solution may be relatively clean. Furthermore, the approach allows for expression evaluation in the SCE (looking ahead if the SCE supports it, in the rule body). Moreover, it should be faster than a single function approach.

This approach may have trade-offs, however. For example, a complicated deployment scenario may be required, as mentioned above. As another example, this approach may have deployment parameter storage in the system. Furthermore, maintenance may be per-rule, not meta, at action level.

The editing, compiling, and translating of rules may be facilitated by using parsing. In the current implementation under discussion, services may be provided for parsing, along with pretty printing, compiling, and translation. For more information on the concepts behind these entities, refer to the discussion above regarding rule concepts. The following discusses the classes, interfaces, and usage of services. These may be modeled using RME.mdl, a rational rose model of the system. It also discusses the hooks provided for filling the hyper-help required by the user during text typing.

In the rule editing environment, parsing and compiling may be used for rules, template text, type identifiers, named conditions, and styling of each of the aforementioned. Pretty printing may be used for rules (in rule engine format and/or personalization format) and/or template text (to the storage format and/or to the "look" format to enable HTML-based linking with the model structurally). Translation may be used for rules (from the personalization format to the rule engine format).

FIG. 13 illustrates a parsing model 1300 for data conveyance management. As illustrated, parsing model 1300 illustrates the major objects—Parser 1310, Parser Callback 1320, and Parse Context 1330—in the parsing services at the interface level. Parser 1310 uses Parser Callback 1320 to build Parse Context 1330, which results from parsing text representing a rule, template text, type identifiers, or named conditions. In accomplishing this, Parser Callback 1320 creates and fills in Parse Context 1330 with information that pertains to the type of parser called.

Parsing may include syntactic parsing and semantic parsing. Semantic parsing may include cross checking symbols within the parsed text itself, linking the symbols that are defined to a model, and type checking the expressions in the parsed text. Parser 1310 itself may do the step of syntactic parsing to build Parse Context 1330. The semantic part of parsing may be handled by Parse Context 1330.

As a result of syntactic parsing, Parser 1310 creates Parse Context 1330, returns a true if the parsing succeeds, and throws a parser exception if a syntax error occurs. As a result of semantic parsing, Parse Context 1330 annotates itself to the model to which it is required to anchor and fills in error records for errors that may occur at stages of semantic parsing. Parse Context 1330 may be responsible for maintaining its state.

The results of parsing vary depending on whether a rule, a template, a type identifier, or styling of any of these was parsed. The results of parsing text representing a rule include declarations, conditions, and actions. Declarations include aliases, groups, and parameters. Conditions include a parse tree for the Boolean expression. Actions include a sequence of the actions and their actual parameters. For the semantic part of rule parsing, the entity to be linked to is the Modeling Environment model.

Template text represents free-flowing, language-dependent text, possibly with annotations, that links to the base rule of the template by defining the text that is used to denote a group for that rule, as well as text for the parameters that are to be shown to a user. The results of parsing text representing template text are rule text, group text, and parameter text. For the semantic part of rule parsing, the entity to be linked to is the Parse Context 1330 of the base rule.

Type-identifier parsing is used to parse the type identifier within a rule. Text parsing may be required for styling the text to be shown in the UI.

Table 5 illustrates a structure for a package of components. This structure is only exemplary, however, as the packages may be readily renamed and/or their functions reorganized into different packages. Such components and/or packages are available from companies such as SAP, ILOG, and Sandia.

TABLE 5

| Package Name | Description |
| --- | --- |
| com.markets.isa.pers.rme | Root package for all the parsing service packages. |
| Parser | The overall interfaces for the Parser. The most frequently used interfaces for the outside world. |
| Parser.base | The base parser implementation |
| Parser.context | The context information for the base parser and the template text parser. |
| Parser.context.template | The context implementation for the template text parser. |
| Parser.Error | The parsing error information and services implementation. |
| Parser.Exception | The parser exception. |
| Parser.Insight | Implementation for presenting intellisense to the user in the text editor for rules. |
| Parser.Prettyprint | The pretty printing services for the base parser, SCE. |
| Parser.Semantic | The link to the Modeling Environment model, provides for typechecking and linking the parse context to the model. |

TABLE 5-continued

| Package Name | Description |
| --- | --- |
| Parser.Templatetext | The parser implementation for the free text of the template. |
| Parser.Test | Testing the package and project |
| Parser.Typeidentifier | The TypeID parser, for internal use only. |
| Translation | Home to the translation services |

An example of how to use Parser 1310 is shown by the following code:

```
/*
Create the type of the parser required for
parsing. The possible types of parsers
supported by the ParserFactory default
implementation are enumerated in the Factory.
This interface may be enhanced to register
the parser with the factory at application
startup for making it extensible by config-
uration rather than as by code segment.
*/
    private static Parser parser =
    ParserFactory.getParser ( null, null,
com.markets.isa.pers.rme.parser.ParserFactory.C_
BASEPARSER);
/*
Initialize the parser with the callback
for the parser.
This may be abstracted out into a factory
interface and a registering interface rather than
having to create the Callback adapter directly here.
*/
    parser.init(newcom.markets.isa.pers.rme.parser.context.
ParserCallbackAdapter( ));
/*
Parse the text syntactically. This would either
return true or throw a parser exception.
*/
    parser.parse(text);
/*
Get the Parse Context for semantic parsing
*/
    ParserContext context = parser.getParseContext( );
/*
Cross check the symbols for internal conflicts.
This could be:
    + Duplicate name checks
    + ...
Returns true if succeeds, false if it fails.
This also fills in error records describing the
errors occurring at this step in the Parser
Context. The Error Records can be retrieved
for usage as shown in a later step.
*/
    Boolean success = context.crossCheckSymbols( );
/*
Link the model to the corresponding external
entity to be linked to. In case of a rule,
this should take an application anchor.
For a template text, this would take the base
rule Parse Context.
*/
    success = success &&
    context.linkSymbolsToModel(null);
/*
Type check the Parse Context relative to the
model that has been linked to.
*/
    success = success && context.typeCheck( );
/*
```

-continued
```
Get the errors that have occurred as a result
of the parsing, syntactic or semantic.
*/
    IErrorRecords errors = context.getErrors( );
/*
Do something with the errors and / or parse context.
*/
```

A parser factory may hold different parsers for different items to be parsed. The factory may be responsible for creating the correct parser, based on the lexical and grammar choice, and getting the parser class definition from the personalization root object.

An example of a Parser Factory is shown below:

- ParserFactory
  - getParser(String lexName, String grName, Object persRoot)
  - C_BASEPARSER
  - C_TEMPLATETEXTPARSER
  - C_TYPEIDBASEPARSER
  - parserList.

In this implementation, the parser factory supports three parsers: 1) personalization base parser, represented by the C_BASEPARSER constant; 2) template text parser, represented by C_TEMPLATETEXTPARSER; and 3) type identification parser, represented by C_TYPEIDBASEPARSER. To implement this, an API for the parser factory could be modified to get to the parser from a constant, which could be a registered component with the factory.

An example of Parser 1310 is as follows:

- Parser
  - getCurrentColumn( )
  - getCurrentGrammarLocation( )
  - getCurrentLine( )
  - getCurrentToken( )
  - getCurrentTokenType( )
  - getNextTokenAsString( )
  - getNetxtTokenType( )
  - getParseContext( )
  - init(ParserCallback_callback
  - parse(String val)
  - parseForStyling(String val).

In implementation, the parser API can be used for parsing for semantic checking, insight, and/or parsing for text styling. An example of parsing for semantic checking and/or insight is illustrated by the following:

```
/*
Initialize the parser with the callback for the parser.
This may be abstracted out into a factory
interface and a registering interface rather than
having to create the Callback adapter directly here.
*/
    parser.init(newcom.markets.isa.pers.rme.parser.context.
ParserCallbackAdapter( ));
/*
Parse the text syntactically. This would either
return true, or throw a parser exception.
*/
    parser.parse(text);
/*
The other API of the parser interface can be
called now. All the other APIs besides the
parseForStyling are used only by the Insight
tool, or by the error message generator.
*/.
```

An example of parsing for styling is illustrated by the following:

```
/*
Initialize the parser with the callback for the parser.
This may be abstracted out into a factory
interface and a registering interface rather than
having to create the Callback adapter directly here.
*/
    parser.init(newcom.markets.isa.pers.rme.parser.context.
ParserCallbackAdapter( ));
/*
Parse the text syntactically. This would either
return true, or throw a parser exception.
*/
    parser.parseForStyling(text);
/*
The other API of the parser interface can be
called now. The other APIs besides the
parseForStyling are used by the Insight tool,
or by the error message generator.
*/
```

The styling APIs of the context could be valid only after calling the parser in this fashion. In particular implementations, the styling and non-styling interfaces could be segregated.

Parser Callback 1320 may be implemented by using the following:

- Parser Callback
  - clean( )
  - fillStyleInformation(int p0, int p1, short tokType)
  - getErrors( )
  - getErrorService( )
  - getParseContext( ).

This interface set is of use primarily to Parser 1310, but could be used by most parsers to fill in any context information as well as errors Similar to Parser Callback 1320 is Rule Parser Callback:

- Rule Parser Callback
  - Parser Callback
    - addAction(String actionName, String[ ] argStrs, short[ ] argTypes, int lineNumber, int columnNumber)
    - createExperssion (String opimage, short opKind, int lineNumber, int columnNumber)
    - createPrimaryExpression(String stringToken, short tokType, int beginLine, int columnNumber)
    - createUnaryExpression(String opimage, short opKind, int lineNumber, int columnNumber)
    - declareAlias(String ruleType, String ruleAlias, int lineNumber, int columnNumber)

-continued

```
    delcareAlias(String subAlias, String
    subAliasType, String superType, int
    lineNumber, int columnNumber)
    declareGroup (String groupName, int
    lineNumber, int columnNumber)
    declare Parameter(String ruleType,
    String paramIdentifier, String
    groupName, String paramValue,
    short paramKind, int lineNumber, int
    columnNumber)
    doConditionDone( )
    doRuleDone( ).
```

Also similar to Parser Callback is Template Parser Callback:

```
☒   Template Parser Callback
    ☒   Parser Callback
        appendToken(String image)
        declareGroupText(String groupName,
        String groupText, int lineNumber, int
        columnNumber)
        declare ParameterText(String
        paramName, String paramText, int
        lineNumber, int columnNumber).
```

An example of code to initialize Parse Context 1330 is:

```
☒   Parse Context
        addStyleInformation(int
        startAt, int endAt, short tok)
        clean( )
        crossCheckSymbols( )
        getErrors( )
        getErrorService( )
        getState( )
        getStyleInformation( )
        isInitial( )
        isSymbolsCrossCheck( )
        isSymbolLink( )
        isSyntactic( )
        isTypeChecked( )
```

-continued

```
    linkSymbolsToModel(Object anchor)
    typeCheck( )
    STATE_INITIAL
    STATE_SYMOBLSCROSSCHECK
    STATE_SYMBOLSLINKED
    STATE_SYNTACTICPARSE
    STATE_TYPECHECKED.
```

This may be used for checking before translation into machine language.

Parse Context 1330 may be responsible for maintaining its state. The state of the Parse Context describes what possible APIs may be called on next with the required effect. The states of the Parse Context are (with each state progressive after the other) shown in Table 6.

TABLE 6

| Name | Description | Valid APIs |
|---|---|---|
| STATE_INITIAL | The initial state of creation of the Parse Context. | clean( ) getErrors( ) getErrorService( ) getState( ) is*( ) addStyleInformation( ) |
| STATE_SYNTACTICPARSE | The Parse Context has completed the syntactic parse of the text. | getStyleInforrnation( ) crossCheckSymbols( ) |
| STATE_SYMBOLSCROSSCHECKED | The Parse Context has cross checked itself for any inconsistencies within its own code. | linkSymbolsToModel( ) |
| STATE_SYMBOLSLINKED | The Parse Context is linked to a model. | typeCheck( ) |
| STATE_TYPECHECKED | The Parse Context is type checked and ready for translation/ code generation. | |

The parse context for a rule may be implemented using the following:

```
☒   Parse Context
    ☒   Parser Context
            AddAction(String actionName, String[ ]
            paramValues, short[ ] paramKind, int
            lineNumber, int columnNumber)
            AddNamedCondition(String conditionName,
            int lineNumber, int
            columnNumber)
            DeclareAlias(String ruleType, String
            alias, int lineNumber,
            intcolumnNumber)
            DeclareAlias(String subAlias, String
            subAlias Type, String superType, int
            lineNumber, int columnNumber)
            DeclareGroup (String groupName, in
            lineNumber, int columnNumber)
            declareParam(String ruleType, String
            paramName, String groupName, String
            paramValue, short paramKind, int
            lineNumber, int columnNumber)
            getActions( )
            getAllAttributes( )
            getAttributes(ModelEntity object)
            getConditions( )
            getDeclarations
            GetModelActions( )
```

-continued

```
✖   getNamedConditions( )
✖   getObjects( )
✖   getParseTree( )
✖   getText( )
✖   setConditionTree(ParseTree condTree).
```

This may be used by a Rule Parser Callback to create the following: aliases, groups, parameters, condition tree, and action sequence. Additionally, this API could be used to build up the Parse Context without parsing and filling these structures in by calls to it. In particular implementations, APIs could be added/removed to the Parse Context so as to make it completely abstracted and manipulable via the API for creating a rule.

The parse context for a template may be implemented by the following code:

```
☒   Template Parser Context
    ☒   Parse Context
        ✖   appendToken(String image)
        ✖   DeclareGroupText(String groupName,
                String groupText, int lineNumber, int
                columnNumber)
        ✖   declareParameterText(String paramName,
                String paramText, int
                lineNumber, int columnNumber).
```

The template text, being free text with annotations, requires only the annotations for semantic checks. However, for pretty printing the text again, the entire text is required; hence, this may require special handling. While the annotations may be created by the declare APIs, the text is appended by the appendToken API.

Pretty printing may be used to translate rules to syntax. FIG. 14 illustrates class relations 1400 for pretty printing for the implementation being discussed. In use, pretty printing may be implemented by the following:

```
/*
Create the pretty printer. May be abstracted to a factory pattern
*/
    m_scePrettyPrinter = new SCEPrettyPrinter( );
/*
Create the StringBuffer in which to print the code
*/
    StringBuffer src = new StringBuffer( );
/*
Print the code represented by the context into the buffer
*/
    m_scePrettyPrinter.prettyPrint((ParseContext)toTranslate, src).
```

An example of translation from the SCE environment to the rule personalization environment is shown below:

```
/*
Create the translator. Could be abstracted out into a Factory pattern.
*/
    SCETranslatorImpl pp = new SCETranslatorImpl( );
/*
Translate the context from the first grammar to the second one.
*/
pp.translate(com.markets.isa.pers.rme.parser.SupportedGrammars.PERS_BASE,
    com.markets.isa.pers.rme.parser.SupportedGrammars.SCE,
    context).
```

This assumes, of course, that the target is the SCE and that the source is the personalization grammar. For a detailed description on how the translated text from rule personalization to the SCE syntax is to look, refer to the previous discussion regarding translation.

In particular implementations, the grammar portions of the API may be abstracted out. In addition, the API may take the grammars as parameters. Furthermore, the object model may be changed to reflect source and target destinations. Additionally, a generic translator may be added. Moreover, factory patterns may be added.

Insight may be provided to a user of the rule personalization structure. For example, help may be provided. Help may be of two types—syntax structure help or semantic help. Syntactic structure help includes help on the grammatical structure of the rule being written. Semantic help implies getting the next possible tokens from the model that could possibly satisfy the grammatical structure.

To accomplish this implementation of insight, the grammar defines an abstraction of the grammatical elements that the parser state can be in when help is requested. The possible grammar elements may be defined by constants in the parser, such as in com.markets.isa.pers.rme.parser.GrammarElementjava. Given the grammatical position and the possible lexical tokens that come from the parser, the classes in this package calculate and list the next possible entries in the textual representation of the rule. FIG. 15 illustrates class relations 1500 for this implementation of user assistance.

In use, the component needs to be exposed only when an exception occurs in parsing. Hence, to jump start the component, the text may be parsed to the point where help has been requested. The following shows one implementation of this:

```
/*
Get the parser exception
*/
    ParserException pex = (ParserException) ex;
/*
Declare the semantic help component
*/
    SemanticRuleInsight sr = null;
/*
Get the syntactic help for the exception, from
the exception. This consists of getting a
list of the next possible tokens.
*/
    retval = _getHelpForSyntax(pex);
/*
For a Lexical error, the next token is null, so distinguish the case
*/
    if (parser.getNextTokenAsString( ) != null)
    {
/*
Create the rule insight component. Requires as input:
+ ApplicationAnchor
```

-continued

```
+ Current Token
+ Current Token Type
+ The location in the grammar where the parsing failed
+ The type of help requested (may not be used)
+ The parser context till then of whatever was parsed
+ The string array which is the list of possible tokens next.
*/
    sr = new SemanticRuleInsight( null,
        parser.getCurrentToken( ) + parser.getNextTokenAsString( ),
        parser.getCurrentTokenType( ),
        parser.getCurrentGrammarLocation( ),
        (short)0,
        (ParseContext)parser.getParseContext( ),
        retval);
    }
/*
getHelp does the actual grunt work of getting
the help out from the semantic help, with
the help of the type lister.
*/
    retval = _merge(sr.getHelp( ), retval).
```

In the examples discussed this far, rules have been primarily considered in the context of having attributes as part of the rule declarations, conditions, and actions. For Java implementations, however, this may be a limitation, because most Java applications like to use methods on the objects that exist in them to write the conditions that they would like to use for pattern-matching. Using methods on objects is probably possible for any type of rule engine such as Jrules, JESS, or SCE, although the latter may have a limited functionality for calling PFUNCTIONS.

As an example of the difference between an attribute and a method, consider a rule having the following form:

```
alias PRODUCT as :prod
where
PRODNAME as :name,
CATEGORY as :cat;
if (SHOPPINGBASKET.ITEM = :prod and :cat = "FOOD")
then
{
    OfferDiscount(2);
}.
```

Thus, a ShoppingBasket Item is modeled as an attribute "ITEM" and the attribute used, even though the natural tendency would be to use "ShoppingBasket.getItem()". The same rule, however, could be written as:

```
    alias PRODUCT as :prod;
    if(SHOPPINGBASKET.getItem( )=:prod and
    :prod.getCategory( ) = "FOOD")
    then
    {
        OfferDiscount(2);
    }.
```

The calling of methods of Java objects in rules, and its implementation and platform dependency, are discussed below. Also, the following features are examined: 1) support for multi-valued attributes and their usage using the IN-type syntax and its semantics; 2) Java.lang.Object support; and 3) null support for method parameters.

In particular implementations, several features may be supported by a personalization framework rule base. For example, the usage of methods may be allowed in the template base rule, named condition, rule, and named condition template base condition. In each case, however, a method may be invokable from only within the condition section. As another example, methods may be called from implicit aliases, object aliases, and/or parameters whose values are object aliases. As a further example, A <IN> B may be supported, where A and B are attributes that are either single or multi-valued. As an additional example, the equality and not equality operator tests may be used for element equality. Other relational operators may or may not be supported if either of the arguments is a multi-valued attribute.

Other features may also be supported. For example, the usage of methods may be allowed in the declaration of variables. As another example, Running-Dot notation (i.e., calling of methods on the results of the call to a method) may be supported. As further examples, method calls in the action section and nested method calls (e.g., a parameter to a method being the result of another method call) may be supported.

Turning to the modeling, a method in a metamodel may be modeled with several features. For example, a method may be attached to an OOClass, have a unique name in the OOClass scope (i.e., a restriction), have a return type, and have an ordered set of parameters, with each parameter having a type. Note that a void return type is acceptable from the modeling perspective; however, it may not be usable from the rules perspective. Additionally, the modeling of multi-valued attributes may be supported in the metamodel, and the modeling of multi-valued parameters may be modeled in the metamodel similar to attribute modeling support.

With regard to syntax, for a method in the condition section of a parsable entity, which may be the only place that a method is usable in some implementations, a syntax change may need to be made to the rule syntax for an expression, to the type identifiers specifically. From the rule perspective, there is no difference between an implicit attribute and a method call. Hence, a method is an implicit alias, and it is also a primary expression. Basically, then, a method call resolves to a parse typed entity.

The syntactic elements that go into describing a method could include input, output, and processing. Input could include the source code written in the syntactic formation required. Output could include Parse Context with the related structures that describe the source code and Parse Context that states if the code was parsed correctly, that throws a ParseException if there is a syntactic exception, and that gives a list of the errors that occurred. Processing may include a syntactic phase and structure generation.

The syntactic phase of parsing may be performed via a JavaCC generated parser, for example. The example of syntax discussed previously for parsing will be used to illustrate this phase of the processing.

For a method to behave as an implicit alias, the definition of a type identifier may be modified as follows:

```
type_identifier      →
                     ( IDENTIFIER
                     (
                     DOT
                     IDENTIFIER
                     )*
                   |
                     ALIASIDENTIFIER
                   |
                     PARAMIDENTIFIER
                     )
                   [
```

```
                    DOT
                    IDENTIFIER
                    LPAREN
                    arguments
                    RPAREN
               ].
```

Other locations in the syntactic grammar may also need to be modified accordingly. Wherever there is a conflict, it may be resolved semantically. Thus, if a method call is used to declare an alias in the declarations section, an error may be logged mentioning the same. A detailed semantic list is outlined below.

Syntactically, the new grammar may look like:

```
/*
 * Comment specification
 */
named_condition      →    (([rule_declarations]
                          expression
                          )
                          |
                          parsable_entity_from_template
                          )
                          <EOF>
named_action         ⇒    (([rule_declarations]
                          rule_actions
                          )
                          |
                          parsable_entity_from_template
                          )
                          <EOF>
rule ⇒               (([rule_declarations]
                          rule_condition
                          rule_body
                          )
                          |
                          parsable_entity_from_template
                          )
                          <EOF>
parsable_entity_from_template ⇒<TEMPLATE>
                          type_identifier
                          <LT>
                          template_value
                          (
                          <COMMA>
                          template_value
                          )*
                          <GT>
template_value ⇒     rule_parameter
                          <EQUAL>
                          param_value
rule_declarations ⇒  (rule_declaration
                          SEMICOLON)+
rule_declaration ⇒   alias_declaration
                          |    param_declaration
                          |    group_declaration
param_declaration ⇒  <PARAM>
                          parameter_type
                          <AS>
                          rule_parameter
                          <LPAREN>
                          group_name
                          <RPAREN>
                          [
                               <EQUAL>
                               param_value
                          ]
parameter_type ⇒     type-identifier
                          |    <CONDITION>
                          |    <ACTION>
group_declaration ⇒  <GROUP>
                          group_name
group_name ⇒         <IDENTIFIER>
param_value ⇒        STRING_LITERAL
                          |    CHARACTER_LITERAL
                          |    INTEGER_LITERAL
                          |    FLOATING_POINT_LITERAL
                          |    type_identifier
type_identifier ⇒    (IDENTIFIER
                          (
                          DOT
                          IDENTIFIER
                          [
                               <LPAREN>
                               [
                               arguments
                               ]
                               <RPAREN>
                          ]
                          )*
                          |    rule_parameter
                          [
                          <DOT>
                          <IDENTIFIER>
                          <LPAREN>
                          [
                          arguments
                          ]
                          <RPAREN>
                          ]
                          |    rule_alias
                          [
                          <DOT>
                          <IDENTIFIER>
                          <LPAREN>
                          [
                          arguments
                          ]
                          <RPAREN>
                          ]
rule_parameter ⇒     <PARAMIDENTIFIER>
alias_declaration ⇒  <ALIAS>
                          type_identifier
                          <AS>
                          rule_alias
                          [
                          <WHERE>
                          sub_alias_declaration
                          (
                               <COMMA>
                               sub_alias_declaration
                          )+
                          ]
sub_alias_declaration ⇒type_identifier
                          <AS>
                          rule_alias
rule_alias ⇒         ALIASIDENTIFIER
rule_condition ⇒     IF
                          expression
expression ⇒         NOT
                          LPAREN
                          Boolean_expression
                          RPAREN
Boolean_expression ⇒ Boolean_and_expression
                          (OR
                          Boolean_and_expression)*
Boolean_and_expression ⇒ equality_expression
                          (AND
                          equality_expression)*
equality_expression ⇒ relational_expression
                          (
                          (
                             <EQUAL>
                          |
                             <NE>
                          |
                             <GT>
                          |
                             <GE>
                          |
                             <LE>
                          |
```

```
                                        <LT>
                                        |
                                        <IN>
                                        )
                                        relational_expression)*
relational_expression ⇒                 multiplicative_expression
                                        (
                                          (
                                            PLUS
                                            |
                                            MINUS
                                          )
                                          multiplicative_expression
                                        )*
multiplicative_expression ⇒             unary_expression
                                        (
                                          (
                                            STAR
                                            |
                                            FSLASH
                                          )
                                          unary_expression
                                        )*
unary_expression ⇒                      (
                                          PLUS
                                          |
                                          MINUS
                                        )
                                        unary_expression
                                        |
                                        exponent_expression
exponent_expression ⇒                   primary_expression
                                        (
                                          (
                                            EXP
                                            primary_expression
                                          )
                                        )*
primary_expression ⇒                    LPAREN
                                        expression
                                        RPAREN
                                        |
                                        literal
                                        |
                                        type_identifier
                                        |
                                        rule_named_condition
rule_named_condition ⇒                  LBRACKET
                                        type_identifier
                                        RBRACKET
literal ⇒                               STRING_LITERAL
                                        |
                                        CHARACTER_LITERAL
                                        |
                                        INTEGER_LITERAL
                                        |
                                        FLOATING_POINT_LITERAL
                                        |
                                        TRUE
                                        |
                                        FALSE
rule_body ⇒                             THEN
                                        LBRACE
                                        rule_actions
                                        RBRACE
rule_actions ⇒                          (
                                          rule_action
                                          SEMICOLON
                                        )*
rule_action ⇒                           type_identifier
arguments ⇒                             argument
                                        (
                                          COMMA
                                          argument
                                        )*
argument ⇒                              rule_alias
                                        |
                                        literal
                                        |
                                        rule_parameter
                                        |
                                        <NULL>.
```

The above syntax has the following features. First, it unifies the type-identifier approach with aliases, parameters, and methods. Additional discrimination and semantic checks may be introduced, however, to identify the correct places of usage of the correct type of type identifier. Additionally, the <IN> operator has been added as a relational operator. Note that after a direct translation of the above into JavaCC format, anything else that is present in the current parser is for structure generation and semantic checking.

With regard to structure generation, the previously discussed parsing architecture in FIG. 13 generates Parse Context 1330 out of the source code. This is generated using Parser Callback 1320, which is called by Parser 1310 at steps of the parsing that require adding any entities.

From the Parse Context, there are three structures generated. First are Parse Declarations 1340, which hold the declarations that the rule uses—template and parameters, groups, parameters, aliases, both explicit and implicit, named conditions, and named actions. Second is a Parse Tree 1350, which holds the condition tree, expected to be a Boolean expression. Third are Parse Actions 1360.

Structure generation is accomplished via the Rule Parser Callback interface that the parser holds. Table 7 specifies a structure generation to grammatical element mapping.

TABLE 7

| Grammatical Element | Structure generation |
|---|---|
| parsable_entity_from_template | DeclareTemplate - declares that this parsable entity derives from a template and specifies the name of the template. Semantic Check - the name of the template is a type identifier. This may be of length one and an identifier. It cannot be an alias identifier or a parameter. Possible implementation - could add a list of short array to the API signature that gives the token types to the method. All the check would need to do is to check if the first token is not an <ALIASIDENTIFIER> or a <PARAMIDENTIFIER> and if the overall is not a method. |
| template_value | AddParameterValue - changes similar as above. However, a parameter value cannot be a method. It can be an alias, a type identifier that is not a method, or a literal. |
| param_declaration | DeclareParameter - a parameter type is a type identifier that is not a method, alias, another parameter related entity, a condition, or an action. Implementation changes could be similar to the first case. |

TABLE 7-continued

| Grammatical Element | Structure generation |
|---|---|
| Parameter_type | May need modification to account for changes in type_identifier. |
| param_value | May need modification to account for changes in type_identifier. |
| type_identifier | May have an IN/OUT parameter, an array list that returns a list of Tokens. May need to return a list of Tokens that resolve to the type a list of arguments, if the type is expected to resolve to a method. For the list of arguments, the argument definition should be returning the correct things. An optional check is to ensure that there are no spaces between the <DOT> tokens of an identifier list. Java does not check for this. |
| alias_declaration | declareAlias - the Type for the alias cannot be a method or be from another alias or parameter. |
| sub_alias_declaration | declareAlias (for sub-aliases) - the Type for the alias cannot be a method or be from another alias or parameter. |
| primary_expression | CreatePimaryExpression - a Primary Expression can now be a method, coming from a type_identifier. Accordingly, this change needs to be made. A Rule NamedCondition cannot be a method or an alias. |
| rule_action | AddAction - an action is now a type_identifier syntactically. Probably, the interface need not change at all. The implementation needs to reflect the type_identifier. An action name's type identifier has the length 1, which is not an alias. It can be a parameter if it is a named action. If it is not a named action, the name cannot be of a parameter type too; it can be only an identifier of length 1. A rule named action should not have an alias name, or be from a method. |
| argument | An argument can be <NULL>, a keyword representing null in Java. This does have translation and type-check repercussions. |

Representative generated structures may be part of a package, such as com.markets.personalization.parser.context.rule. In these, one structure may be generated per declaration. Table 8 describes the rule element and its corresponding structure.

TABLE 8

| Rule Element | Structure |
|---|---|
| Alias | ParseAlias - declares the types that are used in the rule which link to a model entity. These are linked to an OOClass or an attribute. In the scenario of an object and/or attribute that is used implicitly within the rule, an alias that is implicit is declared when the usage is encountered for the first time. Logically, a method could extend this implementation. |
| Parameter | ParseParameter - represents a parameter whose value is to be filled only through a template usage. |
| Group | ParseGroup - grouping of parameters for Template Text usage. |
| NamedCondition | ParseNamedCondition - declared when a named condition is encountered in a rule. Links to a named condition in the metamodel. |
| NamedAction | ParseNamedAction - declared when a named action is encountered in a rule. Links to a named action in the metamodel. |
| Template | ParseTemplate - used to create a parsable entity from a template. |
| Condition | ParseTree - the condition tree, a binary tree representation of the conditional expression. |
| Declarations | ParseDeclarations - the combination of the declarations. |
| Rule Body | ParseActions - a sequential set of actions. |

With regard to error handling, there may be uniform or non-uniform ways of handling errors that occur during parsing. In one implementation, a non-uniform way of handling errors that occur during parsing is used. This discrepancy may occur between syntactic and semantic parsing handling. For example, syntactic parsing may throw a parse exception that stems from the fact that JavaCC does the same as it stops processing the source, but semantic parsing may continue to process even after the first error is found, so as to give the user a set of errors simultaneously at whichever stage the parser is at. This is advantageous in that a user may possibly correct multiple errors at one shot, an approach taken by most current Integrated Development Environments.

The discrepancy between syntactic parsing and semantic parsing, however, may be regarded as somewhat ambiguous, and may be removed. In one implementation, all JavaCC exceptions are caught, an error message is added to the error list, and another exception is thrown. The processing could be changed, for example, to throw no exceptions, catch all exceptions, add the error message, and return a true only if no errors have occurred. This would unify both the approaches. It may also become increasingly important to do so due to the fact that semantic errors in defining may now occur during the first syntactic phase.

After the source code is syntactically correct, semantic checking may begin. Semantic checking may include three steps: 1) cross checking symbols; 2) linking to a metamodel; and 3) type checking.

Cross checking symbols involves checking the source code within itself without any external referencing mechanisms. Cross checking is outlined in Table 9.

TABLE 9

| Rule Entity | Checks |
| --- | --- |
| Method | None |
| Method argument | Case argument is:<br>Alias: Check if this alias has been explicitly declared. May or may not allow implicit aliases as parameter values<br>Parameter: Check if this parameter has been declared. |
| <IN> | None. Standard checks apply |

Linking to a metamodel involves linking the entities that are declared, whether implicit or explicit, with the metamodel. Table 10 outlines the linking.

TABLE 10

| Rule Entity | Link to |
| --- | --- |
| Method | Similar to attribute resolution. Resolve the object first from the classification entity scope. Then resolve the method. In particular implementations, the following assumption may be made: a method is identified by a unique name in its class's scope. |
| Method argument | There are two approaches to doing this. Once a method is linked, one can link to each parameter object or defer any other processing till type checking phase, as that is the only thing that needs to get done on these arguments. |
| <IN> | None: Standard algorithm applies |

Type checking involves checking the method and its parameters. Table 11 outlines this procedure.

TABLE 11

| Rule Entity | Type Check |
| --- | --- |
| Method | The type of a method is its return type, which is a data type object in the metamodel. In an expression, the primary expression that this method forms has this type, which can then later be reused to find out the type equivalence of expressions. |
| Method argument | Type checking for arguments is similar the type checkings done for arguments in the actions section. The addition that needs to be performed at both places is for the type checking of super-types in the scenario that the formal argument has a datatype that is of the OOClass nature and the class of the real argument is a sub-class of that OOClass. The above may or may not be supported. Moreover, supporting explicit type casts may or may not be supported. Additionally, a <NULL> real argument may passed to a formal argument that is of the type string or any object type. |
| <IN> | Assuming the syntax to be A <IN> B, both A and B are expected to be object type expressions and to be leaf nodes. A and B need to have the same base type, or A needs to be a base type for the type that B is. Thus, if A is multi-valued, then B necessarily is multi-valued, or if A is single-valued, then B may be single or multi-valued.<br>In case B is single-valued, this reduces to an equality. All other cases are errors. |
| Other Relational Operators | For <EQUAL>, <NE>, the LHS and RHS may be both single or multi-valued. For others, the LHS and RHS may have to be single-valued, numeric. |
| Action and Method Arguments | Actions and methods are as described previously. |
| Parameter Type(s) | Multi-valued attributes as parameters may or may not be supported. |

In particular implementations, a parser may produce help for a user. For example, a parser may generate lexical, production, and/or semantic assistance.

Lexical help is the assistance that the parser produces at any given time when it mentions the next possible tokens that the parser expects wherever it has stopped parsing. This comes through a parse exception in the case of JavaCC for free.

Production help may be implemented for JavaCC by a set of classes. The implementation may parse the JavaCC file itself and get the production help from the respective BNF productions that it finds in the file. So, for any grammar change, this help is automatically generated from the file. While this implementation is specific to JavaCC, production help may be implemented on any parser-generator.

The grammar stack from the parser gives the current position of the person typing the rule in at any point of time. This helps to simulate the location in the UI and direct the focus to the correct location in the production tree.

For each production in the grammar, the short variables may need to be declared and the stack maintained appropriately for the same for this help to work correctly. To get the language-dependent descriptions for the UI, the names of the productions are used for retrieval from the standard properties file for the UI. This is valid for each node. Hence, the files GrammarElement, GrammarElementUtility, LexiconTypeConstants, and LexiconTypeUtility need to get updated with the correct constant values. The GrammarElementUtility file also gives a mapping from the short values of the grammar position to the language independent strings of the productions required by the UI for the lookup, which should map one-on-one with the productions.

Semantic help is the help that comes from the metamodel. What to show is calculated from the grammar stack, and then, the list is fetched from the metamodel. Functions to locate the position for a method help may need to be added. Also, the same may be needed to fetch the method list from the OOClass. The attribute algorithm may be used as a base. For the <IN> case, it is similar to the other relational operator cases.

Pretty printing may also be used in particular implementations. Pretty printing typically has input, output, and processing. In one implementation, pretty printing uses parser context that has its symbols cross checked for input and source code of the parsable entity for output. The processing may be accomplished by sequentially iterating over the declarations, conditions, and actions of the context to generate the same source code for personalization syntax.

The pretty printer for Jrules and SCE have the following properties: 1) they expect that there are no named conditions, named actions, and parameters that do not have values in them; and 2) the template-based entities have a merged parse context. Essentially, therefore, they expect that code-merging has happened prior to passing these in for printing. The printers, however, will probably have to be enhanced to handle methods.

Different considerations come into play for SCE and Jrules when implementing multi-valued attributes. For SCE, the equal operator implicitly implements the <IN> operator semantics defined previously for multi-valued attributes. For Jrules, the following methods may be implemented in the runtime context: 1) Boolean evaluateOperator(String opName, Object operand1, Object operand2); and 2) Boolean evaluateoperator(short op, Object operand1, Object operand2). Then, each time the operators <EQUAL>, <NE>, and <IN> are encountered, if any of the arguments is multi-valued, one of these methods needs to be called. Thus, for a string equality, instead of generating A=B or A.equals(B), for multi-valued attributes, this could be ?context.evaluateOperator (<OPERATOR>, A, B).

With regard to deployment of methods in rules, for the metamodel, modeling methods in Jrules and SCE may have to implemented, as the correct method name needs to be returned by the deployer interface. For translation, where methods are allowed to be used only in conditions, if the parsing phase is accomplished acceptably translation-wise, algorithmically, there is no change except for the fact that if there is any method call in the rule, the rule may not be translatable to SCE format. For merging the code, additional care needs to be taken to ensure that name mangling happens for aliases and parameters attached to aliases for methods in all of the sections.

If a styling parser is present, the only change that may be necessary to it is due to the introduction of a new set of keywords—<IN> and <NULL>. These may be added to the token list of the styling parser. The text editor applet may need to be rebuilt for the same too. The styling parser, however, could be completely removed from the parsing services.

At runtime, having methods in rules may be transparent for Jrules. Implementation for SCE, however, may require additional support from SCE and might have non-trivial run time changes.

For multi-valued attributes used with SCE, the STRINGVALUE, NUMERICVALUE, and OBJECTVALUE attributes of the PERSACTIONPARAMETER object may need to become multi-valued during deployment, and the runtime may need to sync to this and implement the right interface out by getting the multi-valued information from the metamodel. For Jrules, the methods described above for pretty printing of Jrules may need implementation in the context for the operators <EQUAL>, <NE>, <IN> and for different parameter types. Additionally, there are again two alternatives for implementation of object equality: 1) reference equality; or 2) Object.equals comparisons. If compatibility with SCE is an issue, it may be that for strings, equals semantics may need to be implemented, but for objects, the reference equality may need to be implemented. Moreover, if the action generation interfaces assume a single-valued attribute passed in, they need to adapt.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices can be used to provide for interaction with a user as well; for example, feedback provided to the user may be any form of sensory feedback (e.g., visual, auditory, or tactile). Furthermore, input from the user may be received in any form, including acoustic, speech, or tactile.

The systems and techniques described here may be implemented in a computing system that includes a back-end component (e.g., as a data server), that includes a middleware component (e.g., an application server), that includes a front-end component (e.g., a client computer having a graphical user interface or a Web browser through which a user may interact with an implementation of the systems and techniques described here), and/or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. Portions of this disclosure discuss data conveyance management by modifying rules for rule engines. This may be implemented by one or more of the systems and/or techniques disclosed, or other applicable systems and techniques. Furthermore, the logic flows depicted in FIGS. 5-6 do not require the particular order shown, or sequential order, to achieve desirable results. In certain implementations, multitasking and parallel processing may be preferable.

Other implementations may be within the scope of the following claims.

What is claimed is:

1. A method performed at a data distribution device, the method comprising:
   determining whether a first message indicating that data conveyance rules are to be modified has been received from a data output device, the data conveyance rules being identified using at least one of a user name for a user associated with the first message and a data output device identifier for the data output device, the data conveyance rules pertaining to messages delivered to the data output device subsequent to the first message, the data conveyance rules being used by the data distribution device to determine under what conditions to send data to the data output device;
   if the first message to modify has been received, identifying at the data distribution device a rule template associated with the data conveyance rules, the identified rule template comprising at least one parameter;
   sending, from the data distribution device to the data output device over a communication network, a second message specifying a user interface corresponding to the identified rule template and the at least one parameter associated with the data conveyance rules that are to be modified, the second message causing the data output device to generate a user interface based on the specified user interface and the identified at least one parameter in the second message;
   determining whether a third message comprising a specification of the parameter has been received from the data output device in response to the second message specifying the user interface; and
   if the third message specifying the parameter has been received, creating a rule by binding the rule template with the specified parameter, the created rule thereafter forming part of the data conveyance rules;
   wherein the data distribution device maintains a state of the data output device so that the data distribution device provides the data output device with only new data.

2. The method of claim 1, wherein the user interface comprises a natural language description of a business function of a data conveyance rule created with the rule template.

3. The method of claim 1, wherein the user interface comprises a natural language description of the parameters for the rule template.

4. The method of claim 1, further comprising:
   identifying a set of rule templates associated with the data conveyance rules to be modified;
   sending a message specifying a user interface corresponding to the set of rule templates; and
   determining whether a message indicating selection of one of the templates in the set has been received.

5. The method of claim 1, further comprising translating the rule into a rule engine format.

6. The method of claim 5, wherein the rule engine format comprises Jrules.

7. The method of claim 1, further comprising:
   determining whether a message comprising a subscription request has been received;
   if a subscription request has been received, identifying data conveyance rules associated with the subscription request; and
   sending data in accordance with the identified rules.

8. The method of claim 1, further comprising:
   associating one of the data conveyance rules with a rule template;
   parsing the rule to identify specifications for parameters of the template; and
   sending a message specifying a user interface corresponding to the associated template, the identified parameters, and the identified specifications.

9. A system comprising:
   a data distribution device comprising:
      memory operable to store:
         a repository comprising data conveyance rules and rule templates associated with the data conveyance rules, the data conveyance rules being used by the data distribution device to determine under what conditions to send data to a data output device, and
         a rule editor for modifying the data conveyance rules and the rule templates; and
      a processor operable to:
         determine whether a first message indicating that a set of the data conveyance rules to be modified has been received from the data output device, the data conveyance rules being identified using at least one of a user name for a user associated with the first message and a data output device identifier for the data output device, the data conveyance rules pertaining to messages delivered to the data output device subsequent to the first message,
         if the first message to modify has been received, identify a rule template associated with the set, the identified rule template comprising at least one parameter,
         generate and send, from the data distribution device to the data output device over a communication network, a second message specifying a user interface corresponding to the identified template and the at least one parameter associated with the data conveyance rules that are to be modified, the second message causing the data output device to generate a user interface based on the specified user interface and the identified at least one parameter in the second message,
         determine whether a third message comprising a specification of the parameter has been received from the data output device, and
         if the third message specifying the parameter has been received, create a rule by binding the rule template with the specified parameter, the created rule thereafter forming part of the data conveyance rules;
         wherein the data distribution device maintains a state of the data output device so that the data distribution device provides the data output device with only new data;
         wherein the data is persisted at the data output device across trips between the data distribution device and the data output device.

10. The system of claim 9, wherein the processor is further operable to:
    identify a set of rule templates associated with the set of data conveyance rules to be modified;

generate a message specifying a user interface corresponding to the set of rule templates; and determine whether a message indicating selection of one of the templates in the set has been received.

11. The system of claim 9, wherein:

the memory is further operable to store a rule translator; and the processor is further operable to translate the rule into a rule engine format.

12. The system of claim 9, wherein:

the memory is further operable to store a rule engine; and the processor is further operable to:

determine whether a message comprising a subscription request has been received, if a subscription request has been received, identify data conveyance rules associated with the subscription request, and send data in accordance with the identified rules.

13. The system of claim 9, wherein the processor is further operable to:

associate one of the data conveyance rules with a rule template;

parse the rule to identify specifications for parameters of the template; and generate a message specifying a user interface corresponding to the associated template, the identified parameters, and the identified specifications.

14. An article of manufacture, comprising:

a non-transitory machine readable storage medium having instructions which when executed by a machine cause the machine to perform operations of:

determining whether a message sent by a data output device indicating that data conveyance rules are to be modified has been received at a data distribution device, the data conveyance rules being identified using at least one of a user name for a user associated with the first message and a data output device identifier for the data output device, the data conveyance rules pertaining to messages delivered to the data output device subsequent to the first message, the data conveyance rules being used by the data distribution device to determine under what conditions to send data to a data output device;

if the message to modify has been received, identifying, by the data distribution device, a rule template associated with the data conveyance rules, the identified rule template comprising at least one parameter;

generating and sending, by the distribution device to the data output device over a communication network, a message specifying a user interface corresponding to the identified rule template and the at least one parameter associated with the data conveyance rules that are to be modified, the second message causing the data output device to generate a user interface based on the specified user interface and the identified at least one parameter in the second message;

determining, by the data distribution device, whether a message comprising a specification of the parameter has been received from the data output device; and if the message specifying the parameter has been received, creating, by the data distribution device, a rule by binding the rule template with the specified parameter, the created rule thereafter forming part of the data conveyance rules;

wherein the data is persisted at the data output device across trips between the data distribution device and the data output device.

15. The article of manufacture in claim 14, wherein the non-transitory machine readable storage medium provides instructions, which when executed by a machine cause the machine to perform operations of:

identifying a set of rule templates associated with the data conveyance rules to be modified;

generating a message specifying a user interface corresponding to the set of rule templates; and determining whether a message indicating selection of one of the templates in the set has been received.

16. The article of manufacture in claim 14, wherein the non-transitory machine readable storage medium provides instructions, which when executed by a machine cause the machine to perform operations comprising translating the rule into a rule engine format.

17. The article of manufacture in claim 14, wherein the non-transitory machine readable storage medium provides instructions, which when executed by a machine cause the machine to perform operations comprising:

determining whether a message comprising a subscription request has been received;

if a subscription request has been received, identifying data conveyance rules associated with the subscription request; and sending data in accordance with the identified rules.

18. The article of manufacture in claim 14, wherein the non-transitory machine readable storage medium provides instructions, which when executed by a machine cause the machine to perform operations of:

associating one of the data conveyance rules with a rule template; parsing the rule to identify specifications for parameters of the template; and generating a message specifying a user interface corresponding to the associated template, the identified parameters, and the identified specifications.

19. A method of managing data conveyance between a data distribution device and a data output device, the method performed at the data output device comprising:

determining whether a command to modify data conveyance rules is received, the data conveyance rules being identified using at least one of a user name for a user associated with the first message and a data output device identifier for the data output device, the data conveyance rules being used by the data distribution device to determine under what conditions to send data to the data output device, the command being initiated by the data output device;

if the command to modify has been received, sending a message to the data distribution device indicating that the data conveyance rules are to be modified including identification data contained within the message for specifying the data conveyance rules that are to be modified, the data conveyance rules pertaining to messages subsequently delivered to the data output device;

determining if a message specifying a user interface corresponding to a rule template and a parameter associated with the data conveyance rules that are to be modified has been received over a communication network from the data distribution device;

if the message specifying the user interface has been received, generating the specified user interface based on the specified user interface and the parameter in the message specifying the user interface;

determining whether a command indicating specification of the parameter has been received via the generated user interface; and if the command specifying the parameter has been received, sending a message comprising a specification of the parameter to the data distribution device for modifying the data conveyance rules for subsequent data delivery by the data distribution device;

wherein the data distribution device maintains a state of the data output device so that the data distribution device provides the data output device with only new data;

wherein the data is persisted at the data output device across trips between the data distribution device and the data output device.

20. The method of claim 19, wherein the user interface comprises a natural language description of a business function of a data conveyance rule created with the rule template.

21. The method of claim 19, wherein the user interface comprises a natural language description of the parameter for the rule template.

22. The method of claim 19, further comprising:

determining whether a message specifying a user interface corresponding to a set of rule templates has been received;

if the message has been received, generating the user interface;

determining whether a command indicating that one of the templates in the set has been selected has been received; and if the command has been received, sending a message indicating selection of one of the templates in the set.

23. A system for managing data conveyance between a data distribution device and a data output device comprising:

a data output device comprising:
a user input device operable to receive a user command;
a display device operable to present a user interface; and
a processor operable to perform steps of:

determining whether a command to modify data conveyance rules is received, the data conveyance rules being used by the data distribution device to determine under what conditions to send data to the data output device, the command being initiated by the data output device, if the command to modify has been received, sending a message to the data distribution device indicating that the data conveyance rules are to be modified, such message including identification data for specifying the data conveyance rules that are to be modified, the identification data identifying an identifier of the data output device, the data conveyance rules pertaining to messages subsequently delivered to the data output device, determining if a message specifying a user interface corresponding to a rule template and a parameter associated with the data conveyance rules that are to be modified has been received over a communication network from the data distribution device, if the message specifying the user interface has been received, generating the specified user interface based on the specified user interface and the parameter in the message specifying the user interface, determining whether a command indicating specification of the parameter has been received via the generated user interface, and if the command specifying the parameter has been received, generating and sending a message comprising a specification of the parameter to the data distribution device for modifying the data conveyance rules for subsequent data delivery by the data distribution device;

wherein the data distribution device maintains a state of the data output device so that the data distribution device provides the data output device with only new data;

wherein the data is persisted at the data output device across trips between the data distribution device and the data output device.

24. The system of claim 23, wherein the processor is further operable to:

determine whether a message specifying a user interface corresponding to a set of rule templates has been received;

if the message has been received, generate the user interface;

determine whether a command indicating that one of the templates in the set has been selected has been received; and if the command has been received, generating a message indicating selection of one of the templates in the set.

25. An article of manufacture, comprising:

a non-transitory machine readable storage medium having instructions which when executed by a machine cause the machine to perform operations of:

determining whether a command to modify data conveyance rules is received at a data output device, the data conveyance rules being used by the data distribution device to determine under what conditions to send data to the data output device, the command being initiated by the data output device;

if the command to modify has been received, sending a message to a data distribution device indicating that the data conveyance rules are to be modified, such message including identification data for specifying the data conveyance rules that are to be modified, the identification data identifying a user name for a user of the data output device, the data conveyance rules pertaining to messages subsequently delivered to the data output device;

determining if a message specifying a user interface corresponding to a rule template and a parameter associated with the data conveyance rules that are to be modified has been received over a communication network from the data distribution device;

if the message specifying the user interface has been received, generating the specified user interface based on the specified user interface and the parameter in the message specifying the user interface;

determining whether a command indicating specification of the parameter has been received via the generated user interface; and if the command specifying the parameter has been received, generating and sending a message comprising a specification of the parameter to the data distribution device for modifying the data conveyance rules for subsequent data delivery by the data distribution device;

wherein the data distribution device maintains a state of the data output device so that the data distribution device provides the data output device with only new data;

wherein the data is persisted at the data output device across trips between the data distribution device and the data output device.

26. The article of manufacture in claim 25, wherein the non-transitory machine readable storage medium provides instructions, which when executed by a machine cause the machine to perform operations of:

determining whether a message specifying a user interface corresponding to a set of rule templates has been received;

if the message has been received, generating the user interface;
determining whether a command indicating that one of the templates in the set has been selected has been received; and
if the command has been received, generating a message indicating selection of one of, the templates in the set.

27. A system comprising:
a data output device; and
a data distribution device;
the data output device operable to:
- determine whether a command indicating that data conveyance rules are to be modified has been received from the data distribution device, the data conveyance rules being used by the data distribution device to determine under what conditions to send data to the data output device,
- if the command has been received, send a message to the data distribution device indicating that data conveyance rules are to be modified, the message including identification data identifying a user of the data output device, the data distribution device associating the user with a set of rule templates,
- determine if a message specifying a user interface corresponding to the set of rule templates has been received from the data distribution device, the user interface comprising natural language descriptions of business functions of data conveyance rules created with the templates,
- if the message has been received, generate the user interface,
- determine whether a command indicating that one of the templates in the set has been selected has been received,
- if the command has been received, send a message to the data distribution device indicating selection of one of the templates in the set,
- determine if a message specifying a user interface corresponding to the selected rule template and a parameter of the selected rule template has been received over a communication network from the data distribution device, the user interface comprising a natural language description of the parameter,
- if the message has been received, generate the user interface based on the specified user interface and the parameter in the message specifying the user interface,
- determine whether a command indicating specification of the parameter has been received, and
- if the command has been received, send a message comprising a specification of the parameter to the data distribution device; and the data distribution device operable to:
- determine whether the message indicating that data conveyance rules are to be modified has been received from the data output device,
- if the message has been received, identify a set of rule templates associated with the data conveyance rules to be modified,
- send the message specifying a user interface corresponding to a set of rule templates to the data output device,
- determine whether the message indicating selection of one of the templates in the set has been received from the data output device,
- identify a parameter for the selected template,
- send the message specifying a user interface corresponding to the selected rule template and a parameter of the selected rule template to the data output device,
- determine whether the message comprising a specification of the parameter has been received,
- if the message has been received, create a rule by binding the rule template with the specified parameter, the created rule thereafter forming part of the data conveyance rules,
- translate the rule into a rule engine format,
- determine whether a message comprising a subscription request has been received from the data output device,
- if a subscription request has been received, identify data conveyance rules associated with the subscription request, and
- send data in accordance with the identified rules to the data output device;

wherein the data distribution device maintains a state of the data output device so that the data distribution device provides the data output device with only new data;
wherein the data is persisted at the data output device across trips between the data distribution device and the data output device.

28. A method as in claim 1, wherein the data is persisted at the data output device across trips between the data distribution device and the data output device.

* * * * *